US012801520B2

(12) United States Patent
Orfaig et al.

(10) Patent No.: US 12,801,520 B2
(45) Date of Patent: Nov. 17, 2026

(54) SPARSE MATRIX COMPRESSION USING RECURSIVE WORD REPLACEMENT MAPS

(71) Applicant: SAMSUNG ELECTRONICS CO., LTD., Suwon-si (KR)

(72) Inventors: Ariel Orfaig, Kfar Bin-Nun (IL); Eran Doron, Herzliya (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/185,809

(22) Filed: Apr. 22, 2025

(65) Prior Publication Data

US 2026/0359208 A1 Nov. 12, 2026

(51) Int. Cl.
*G06F 12/00* (2006.01)
*G06F 12/02* (2006.01)

(52) U.S. Cl.
CPC ................................ *G06F 12/0223* (2013.01)

(58) Field of Classification Search
CPC .................................................. G06F 12/0223
USPC ........................................................... 711/154
See application file for complete search history.

(56) References Cited

U.S. PATENT DOCUMENTS 4,586,027 A 4/1986 Tsukiyama et al.
6,674,908 B1 * 1/2004 Aronov .............. H03M 7/3088 382/248
8,775,495 B2 7/2014 Lumsdaine et al.
9,843,341 B1 12/2017 Yang
10,644,721 B2 5/2020 Bajic et al.
11,362,672 B2 6/2022 Verrilli et al.
11,720,252 B1 8/2023 Heddes et al.

FOREIGN PATENT DOCUMENTS

CN 103825621 B 2/2017
CN 107977468 B 12/2021
CN 117579225 B 5/2024
CN 121189743 A * 12/2025

(Continued)

OTHER PUBLICATIONS

Burton H. Bloom, "Space/Time Trade-offs in Hash Coding with Allowable Errors", Communications of the ACM, vol. 13, No. 7, Jul. 1970, pp. 422-426, DOI: 10.1145/362686.362692.

(Continued)

*Primary Examiner* — Mardochee Chery
(74) *Attorney, Agent, or Firm* — Sughrue Mion, PLLC

(57) ABSTRACT

A sparse matrix is compressed using recursive application of word replacement based on a bijective process. The bijective process generally shrinks sequences of zeros. The shrinkage generally continues at a geometric rate with additional recursions, up to a limit. The bijective process reaches a global minimum for an output sequence. After the global minimum is reached, the length of the output expands at a linear rate. Due to the bijective process, decompression is able to proceed in a lossless manner to exactly recover the input sparse matrix. Clusters of non-zero bits in the sparse matrix may be in a single line or distributed across neighboring lines. Clusters in a single line are addressed by a design parameter corresponding to a distance between binary-1s in the data. Clusters distributed across neighboring lines are flattened using a pre-processing stage.

20 Claims, 9 Drawing Sheets

(56) References Cited

FOREIGN PATENT DOCUMENTS

| | | | | | |
|---|---|---|---|---|---|
| WO | WO-2024003577 A1 | * | 1/2024 | ........... | H04N 19/597 |

OTHER PUBLICATIONS

Augusto Y. Horita et al., "Lempel-Ziv-Markov Chain Algorithm Modeling using Models of Computation and ForSyDe", Aerospace Technology Congress, Oct. 2019, Stockholm, Sweden, pp. 152-155, DOI: 10.3384/ecp19162017.

Nikhil G S et al., "Efficient Compression Technique For Large Size Binary Sparse Matrix Using Modified Run Length Encoding For Memory Constraint Embedded Systems", International Conference on Intelligent and Innovative Technologies in Computing, Electrical and Electronics (IITCEE), Jan. 2023, pp. 916-921, DOI: 10.1109/IITCEE57236.2023.10091013.

* cited by examiner

SPARSE MATRIX COMPRESSION USING RECURSIVE WORD REPLACEMENT MAPS

FIELD

The present disclosure is related to compression of sparse sequences containing a large number binary-0 and relatively few binary-1.

BACKGROUND

During the manufacturing of sensor modules, some pixels do not perform as expected and are marked as Bad Pixels (BPs), and the number of bad pixels and the ability to store them in memory affects the yield factor of the manufacturing process. By developing a better method to store those bad pixels in memory the yield factor of the process can be improved and manufacturing costs can be reduced.

A given bad pixel map ($m_{bp}$) can be generally considered as a 2D sparse binary map/image in the size of a given sensor Color Filter Array (CFA) with width W and height H $$(m_{bp} \in Z_2^{H\times W}).$$

Although the bad pixel map $m_{bp}$ is a 2D map, it is commonly referred to as a 1D sparse binary sequence ($s_{bp}$) of length $$W \cdot H = N(s_{bp} \in Z_2^{1\times N}).$$

A given binary sequence of length N will be considered as sparse if the number of binary-0, $N_0$, is much larger than the number of binary-1, $N_1$ ($N_0>>N_1$, $N_0+N_1=N$). Storing this sequence directly in memory will require $\lceil N/8 \rceil$ Bytes; this is ineffective since most of the bytes in memory will be zeros. For example, if $N=2\cdot 10^8$ (200M Pixels sensor) and $N_1=1000$ (number of BPs) then 25 M Bytes are needed to store it directly in memory.

A more conventional method to represent sparse sequences is to store only the index or coordinate of the non-zeros and its value (e.g., Coordinate list (COO method). In the case of sparse binary sequences, the non-zeros can be only binary-1 so only the indices are stored. For a given binary sequence of length N, each index will require $\lceil \log_2 (N) \rceil$ bits and the total memory size for N 1 binary-1s will be $\lceil N_1 \cdot \lceil \log_2 (N) \rceil / 8 \rceil$ Bytes. For the example above, where $N=2\cdot 10^8$ and $N_1=1000$, each index will require 28 bits and the total memory size will be 3.5 K Bytes. In this method if the input sequence includes m adjacent binary-1s (cluster BPs) m indices are needed to store them without loss of information.

If some assumptions are made concerning input statistics, e.g. assuming that the maximal distance between two non-zeros is always less than some number M, then the input can be represented incrementally by storing only the value of differences between two non-zeros ($\lceil\ \rceil$ per each difference). In case of a binary sequence, the total memory size for $N_1$ binary-1s will be $\lceil N_1 \cdot \lceil \log_2 (N) \rceil / 8 \rceil$ Bytes. For the example above, where $N=2\cdot 10^8$ and $N_1=1000$, if the assumption is correct that the non-zeros are almost uniformly distributed across the input, then $M=\lceil N/N_1 \rceil = 2\cdot 10^5$, so each difference will require 18 bits and the total memory size will be 2.25 K Bytes. In this method as in the index list method, if the input sequence is a sequence of m adjacent binary-1s (cluster BPs) m differences are needed to store them (losslessly) in spite the fact those differences are zero. Moreover, if for some reason the assumption about the difference is not correct, for even a single difference, this method cannot be used for lossless representation since it is necessary to add additional synthetic non-zeros in the median.

SUMMARY

Provided herein is a method of compressing an initial input sequence including a plurality of words to obtain a compressed output sequence using a plurality of recursion stages, the method including: inputting a first word into a first recursion stage of the plurality of recursion stages, wherein the plurality of words includes the first word; replacing, in the first recursion stage, the first word to obtain a second word and outputting the second word to a second recursion stage of the plurality of recursion stages; repeating the inputting, replacing and outputting until a final word of the initial input sequence has been replaced by the first recursion stage, wherein the plurality of words includes the final word, wherein successive recursion stages continue to perform inputting, replacing and outputting until no further second words are provided to them from an upstream recursion stage, and wherein an output sequence observed at an output of a final recursion stage of the plurality of recursion stages is the compressed output sequence.

Also provided herein is an apparatus for compressing an initial input sequence including a plurality of words to obtain a compressed output sequence using a plurality of recursion stages, the apparatus including: a plurality of word replacement operators configured in a pipeline fashion, the plurality of word replacement operators being indexed with an index k, and the index k ranging from 1 to N, an input terminal configured to accept input words of an initial sequence; an output terminal configured to provide output words for storage in a memory; and a controller configured to control the plurality of word replacement operators, a first word replacement operator configured to accept a first input word from the input terminal and replace the first input word with a first output word and pass the first output word to a second word replacement operator, wherein the first word replacement operator is configured with the index of k=1 and the second word replacement operator is configured with the index of k=2, wherein N-2 instances of the plurality of word replacement operators are configured as a k-th word replacement operator configured to accept a second input word from a (k−1)-th word replacement operator and replace the second input word with a second output word and pass the second output word to a (k+1)-th word replacement operator, wherein a last instance of the plurality of word replacement operators is configured as an N-th word replacement operator configured to accept a third input word from an (N−1)-th word replacement operator, replace the third input word with a third output word and pass the third output word to the output terminal, and wherein the controller is configured to: provide the input words from the initial sequence to the first word replacement operator until the initial sequence is exhausted, and activate word replacement at each word replacement operator which has received a word from an upstream word replacement operator.

In some embodiments, the apparatus includes a pre-processing stage configured upstream from the plurality of word replacement operators and after the input terminal, the pre-processing stage including a processor and a second memory, the second memory storing computer program code configured to cause the processor to: identify cluster shapes in the initial input sequence, wherein the initial input sequence represents a two dimensional array of pixels, and a cluster shape represents a cluster of bad pixels (BPs), assign a first fixed bit sequence (FBS) of a set of fixed bit sequences to a first cluster shape, retain a dictionary indicating the first FBS assigned to the first cluster shape and a second FBS assigned to a second cluster shape, perform a replacement of cluster shapes of the initial input sequence with corresponding FBS values from the dictionary to obtained a flattened sequence, and provide the flattened sequence to the first word replacement operator as an input sequence to be processed.

Also provided is non-transitory computer readable medium storing instructions, the instructions configured to cause one or more apparatuses to perform inputting a first word into a first recursion stage of the plurality of recursion stages, wherein the plurality of words includes the first word; replacing, in the first recursion stage, the first word to obtain a second word and outputting the second word to a second recursion stage of the plurality of recursion stages; repeating the inputting, replacing and outputting until a final word of the initial input sequence has been replaced by the first recursion stage, wherein the plurality of words includes the final word, wherein successive recursion stages continue to perform inputting, replacing and outputting until no further second words are provided to them from an upstream recursion stage, and wherein an output sequence observed at an output of a final recursion stage of the plurality of recursion stages is the compressed output sequence.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Overview

Embodiments use a recursive word replacement approach such that in each iteration the long binary-0 sequences between the binary-1 (or BPs) shrink, while constraining the number of ones that may be added to the processed sequence after a given iteration.

Thus, the present application provides algorithms which improve sparse binary sequence compression. These can be used, for example, for the propose of static bad pixel compression. Three algorithms (Algorithm 1, Algorithm 2 and Algorithm 3) are developed and each algorithm uses recursive word replacement maps. In each iteration, the long sequences of zeros between the ones (or BPs) shrink while sometimes incurring a price of including an iteration tail. Each algorithm exhibits a characteristic of an iteration tail of previous iterations. The iteration tail is not affected by the next iteration by design. When expansion occurs, it is due to binary-0s occurring before the iteration tail.

The stability of the fixed bit sequences is used to handle D dimensional near binary-1s (clusters of binary-1s). The process uses a pre-process operation to flatten the clusters by encoding cluster shapes to a fixed bit sequence.

Algorithm 1 uses a single replacement map. Algorithm 2 uses three replacement maps and behaves as a state machine where each state is associated with one of the three maps. Algorithm 3 is designed to handle many kinds of distributions of sub-sequences lengths (number of zeros) in a full data scale-a sparse data that consists of a concatenation of many subsequences in various lengths.

Benefits of embodiments are: i) improving yield factor of sensor products by avoiding the discarding of manufactured instances having a large number of static BPs, ii) reducing a size of OTP (one time programming) memories for storing locations of static BPs, iii) performing real-time compression of dynamic BPs or other binary label indications during a processing of a next frame, rather than using a frame buffer.

Embodiments provide a novel method for sparse data compression. The embodiments can be implemented in pipe-line hardware or in software.

Overall System

Figure 1A:
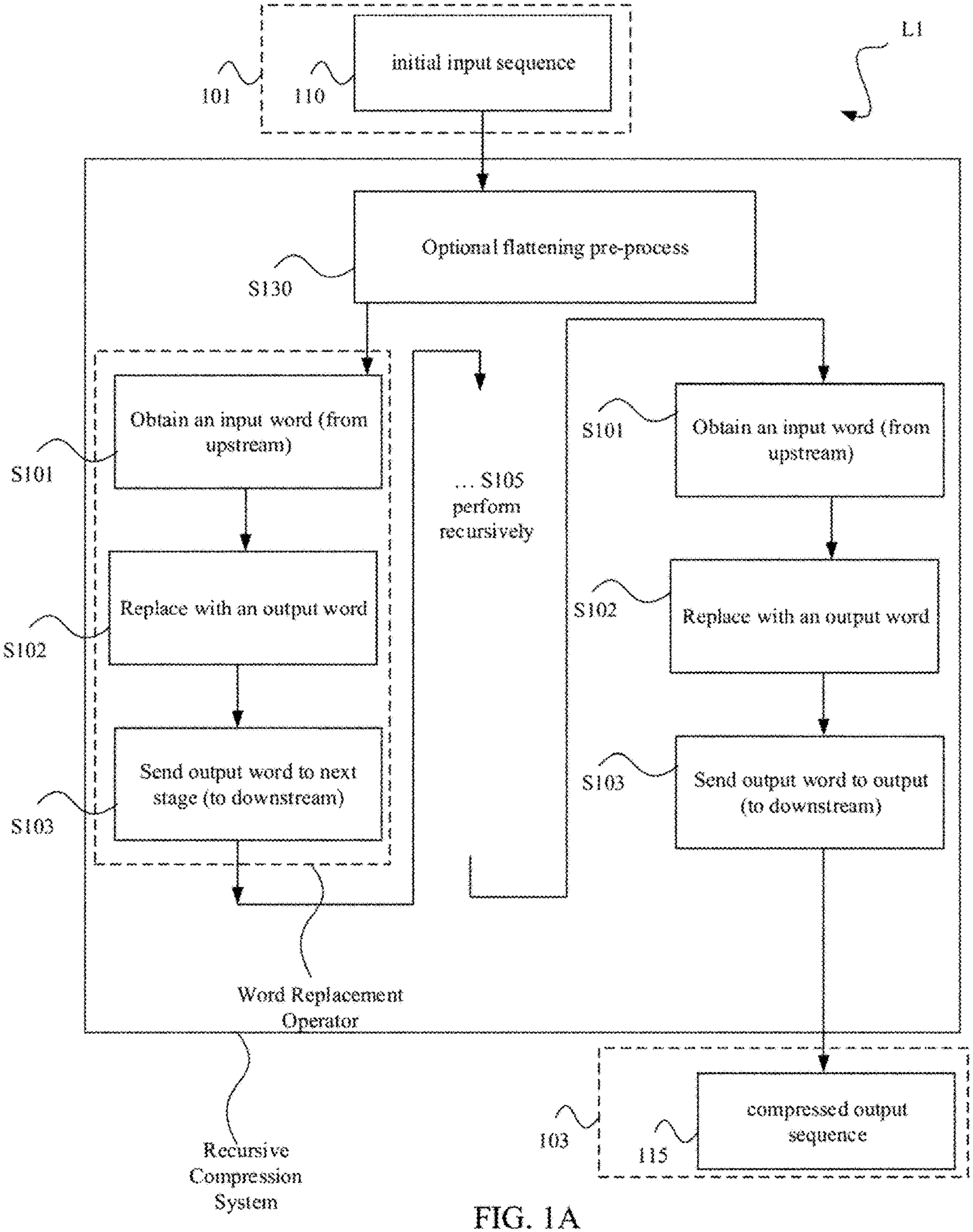
FIG. 1A illustrates a recursive algorithm for obtaining a compressed output sequence by compressing an initial input sequence, according to an exemplary embodiment.

FIG. 1A illustrates an initial input sequence 110 (which may be obtained from a memory 101). The initial input sequence 110 is processed by a recursive compression system 102 (the compression may be implemented in software or hardware). The recursive compression system outputs a compressed output sequence 115 which is stored, in one example, in a memory 103. The memory 101 and memory 103 may be the same memory component.

Figure 1B:
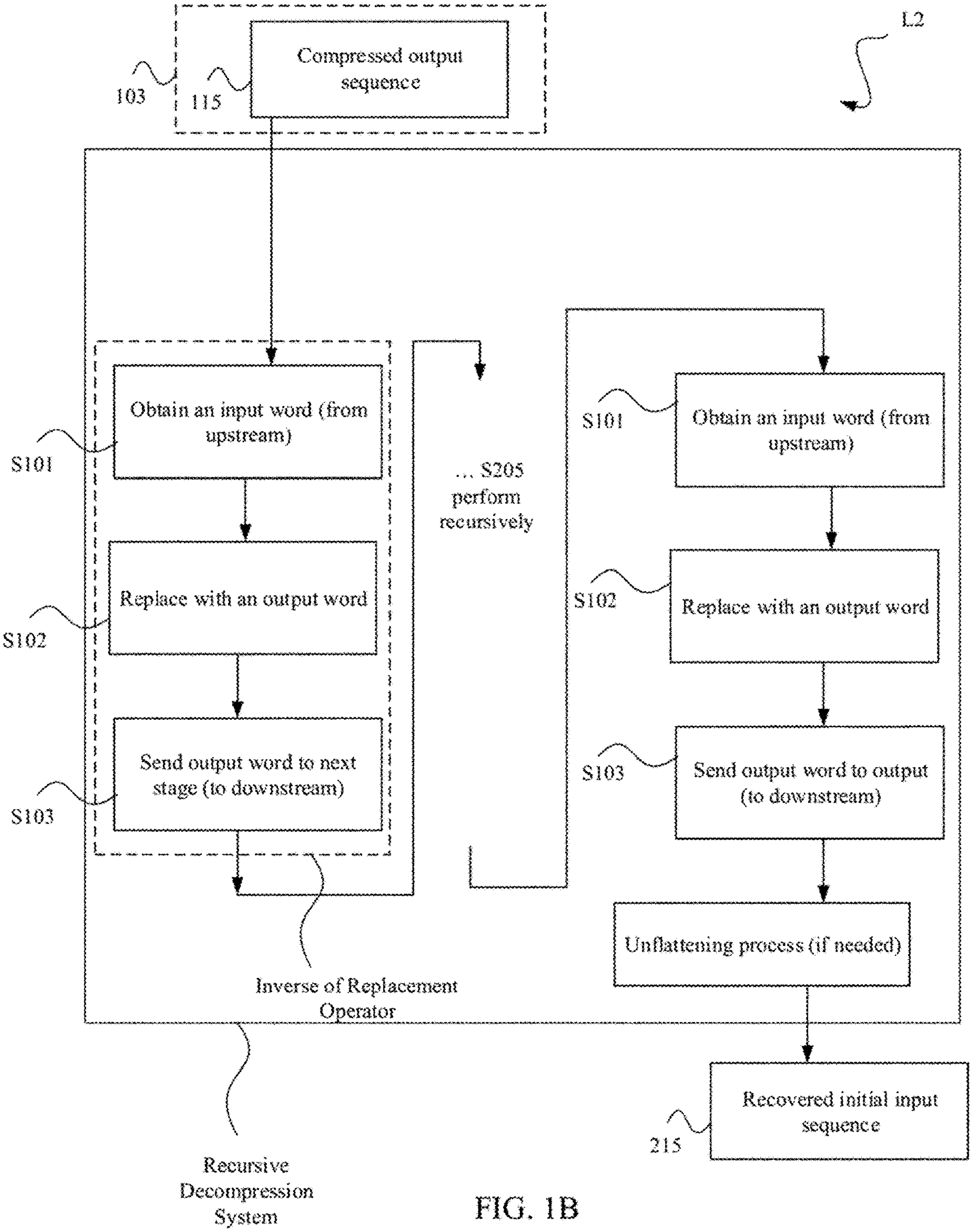
FIG. 1B illustrates a recursive algorithm for recovering the initial input sequence from the compressed output sequence of FIG. 1A, according to an exemplary embodiment.

FIG. 1B illustrates a recursive decompression system which processes the compressed output sequence 115 to obtain a recovered initial input sequence 215. In general, the compression of FIG. 1A and the decompression of FIG. 1B form a lossless transform, and the recovered initial input sequence 215 is equal, bit for bit, to the initial input sequence 110. The recursive decompression system may be implemented in software or hardware.

Algorithm 1

Algorithm 1 provides a compact word replacement rule. Algorithm 2 will be developed further below.

The word replacement map of Algorithm 1 is provided in Table 1. An operator performing the word replacement is defined as E(·).

TABLE 1

(the rules of Algorithm 1)

| Operation (performed by E (·)) | Input (see S101 of FIG. 1A ) | Output (see S103 of FIG. 1A) | Note |
|---|---|---|---|
| E1 | {0, 0, 0, 0} | {0, 0, 0} | Replace {0, 0, 0, 0} with {0, 0, 0}; 25% reduction |
| E2 | {0, 0} | {1, 1} | Replace {0, 0} with {0, 0, 1}; expansion |
| E3 | {0, 1} | {0, 1} | Copy {0, 1} to {0, 1} |
| E4 | {1} | {1} | Copy {1} to {1} |

For a given binary sequence (initial input sequence 110), a single iteration of Algorithm 1 will run over the input bits from the beginning to the end and replace known words from the input with patterns according to Table 1.

The replacement performed by E(·) may be implemented as illustrated by S102 in FIG. 1. For example, in hardware, the replacement may be performed by K instances of a hardware circuit including an input register 201 (also referred to as "input buffer"), Boolean logic 202, an output register 203 (also referred to as "output buffer"), clock circuits 204 and a lookup table 205. In some implementations, the output register 203 may be realized by the input register 201 of the next downstream stage.

Figure 3:
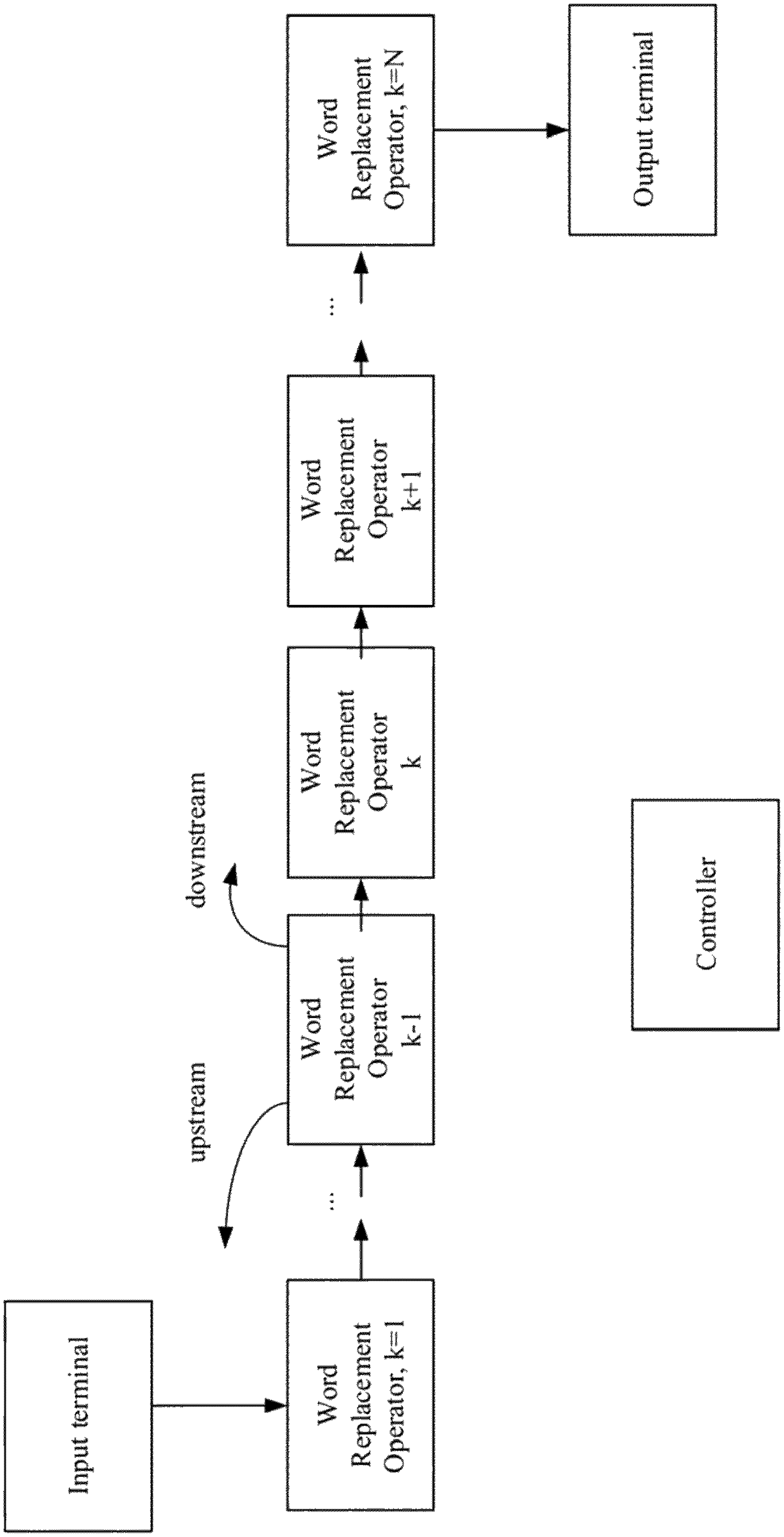
FIG. 3 illustrates a pipeline architecture for the recursive algorithm of FIG. 1, according to an exemplary embodiment.

FIG. 3 illustrates an example of a pipeline implementation of the recursive compression system of FIG. 1A. The pipeline is illustrated as N instances of the word replacement operator of FIG. 1A. The instances are indexed by the index k. From the viewpoint of word replacement operator k−1, an earlier operator, closer to the input terminal, is upstream. A later operator, closer to the output, is downstream. The initial input sequence enters the word replacement operator with k=1, and E(·) is applied, with the output being passed downstream to the word replacement operator with k=2, which then applies E(·). The data flows through the pipeline, and E(·) is applied to the words flowing from left to right (upstream to downstream) in FIG. 3. The output of the last word replacement operator with k=N is the compressed output sequence. The word replacement operators may be controlled by a controller to move the data along the pipeline.

Example 1

As an example, let initial input sequence 110 be the sequence {0,0,0,0,0,0,0,0,0,0,1,0,1}. This is a binary sequence of length 13. In field notation this sequence is an element of $$Z_2^{\{1\times 11\}}.$$

The recursion using Table 1 parses this sequence as follows.

| Parsing | E({0, 0, 0, 0}) | E({0, 0, 0, 0}) | E ({0, 0}) | E ({1}) | E ({0,1}) |
|---|---|---|---|---|---|
| Note | Shrink 25% | Shrink 25% | expand | copy | Copy |
| Result of word replacement | {0, 0, 0} | {0, 0, 0} | {0, 0, 1} | {1} | {0, 1} |

The output sequence of this single iteration is {0,0,0,0,0,0,0,0,1,1,0,1} which is an element of $$Z_2^{\{1\times 12\}}.$$

The map of Table 1, that is E(·), can process any binary sequence which ends with a binary-1. Due to the structure of E(·), E(·) operates independently on each sub-section of initial input sequence 110 between binary-1s.

Example 2

In Example 2, the input sequence {0, . . . , 0, 1, 0, . . . , 0, 1} is of length N0+N1+2 and there are only two binary-1s present. Between the binary-1s are subsequences of binary-0 with lengths N0 and N1.

The independent processing is shown below. The processing of the initial input is the same as concatenating the result of processing a first string with the result of processing a second string (see below).

| Initial Input: | First String: | Second String: |
|---|---|---|
| $E(\{0, \ldots, 0, 1, 0, \ldots, 0, 1\} \in Z_2^{1\times(N0+N1+2)})$ | $E(\{0, \ldots, 0, 1\} \in Z_2^{1\times(N0+1)})$ | $E(\{0, \ldots, 0, 1\} \in Z_2^{1\times(N1+1)})$ |

The problem has been simplified by superposition principle. Without loss of generality, the performance of Algorithm 1 can be found by considering the effect of E(·) on sub-sequences between two binary-1s.

Considering a sequence of K binary-0s followed by a binary-1, the operation of E(·) is as follows. The K binary-0s followed by a 1 is the initial input, labelled as initial input sequence 110 in FIG. 1A.

Example 3

$$E(\{0, \ldots, 0, 1\} \in Z_2^{1\times(K+1)}) =$$

$$E(\{0,0,0,0\} \in Z_2^{1\times 4}) \cdots E(\{0,0,0,0\} \in Z_2^{1\times 4}) \quad E(\{0,\ldots,0,1\} \in Z_2^{1\times(K\bmod 4)+1})$$

Performing the replacement E1 on the separate groups of 4 binary-0s, the resulting intermediate result is $$E(\{0,\ldots,0,1\} \in Z_2^{1\times(K+1)}) =$$

$$E(\{0,0,0,0\} \in Z_2^{1\times P}) \quad E(\{0,\ldots,0,1\} \in Z_2^{1\times(K\bmod 4)+1})$$

Where P=3⌊K/4⌋ and "⌊·⌋" is the floor function.

The last term is reduced by E as shown here. The algorithm is to examine the incoming bits until a sequence appears which can be processed by E1, E2, E3 or E4 of Table 1.

$$E(\{0,\ldots,0,1\} \in Z_2^{1\times(K\bmod 4)+1}) = \begin{cases} E(\{1\}) & \{1\} & \text{for } K \bmod 4 = 0 \\ E(\{0,1\}) & \{0,1\} & \text{for } K \bmod 4 = 1 \\ E(\{0,0,1\}) & \{0,0,1,1\} & \text{for } K \bmod 4 = 2 \\ E(\{0,0,0,1\}) & \{0,0,1,0,1\} & \text{for } K \bmod 4 = 3 \end{cases}$$

After the first iteration of E on the initial input sequence 110 of binary-0 of length K followed by a single binary-1, the result is one of four possibilities as shown below. The four possible outputs are labelled Sequence A, Sequence B, Sequence C and Sequence D.

$$E(\{0,\ldots,0,1\} \in Z_2^{1\times(K+1)}) = \begin{cases} \text{Sequence } A\text{: } \{0,\ldots,0,1\} \in Z_2^{1\times P0} & P0 = 3[K/4]+1 \text{ for } K \bmod 4 = 0 \\ \text{Sequence } B\text{: } \{0,\ldots,0,1\} \in Z_2^{1\times P1} & P1 = 3[K/4]+2 \text{ for } K \bmod 4 = 1 \\ \text{Sequence } C\text{: } \{0,\ldots,0,1,1\} \in Z_2^{1\times P2} & P2 = 3[K/4]+4 \text{ for } K \bmod 4 = 2 \\ \text{Sequence } D\text{: } \{0,\ldots,0,1,0,1\} \in Z_2^{1\times P3} & P3 = 3[K/4]+5 \text{ for } K \bmod 4 = 3 \end{cases}$$

From the above, it is implied that, on the first iteration, the length of the binary-0 sequence was reduced by approximately 25% and a new binary-1 was added with probability of 0.5. The addition of a binary-1 is referred to as an iteration tail.

For K mod 4=0, the first iteration has repeatedly taken in 4 binary-0 and output 3 binary-0, and this happens ⌊K/4⌋ times. Thus the length of Sequence A (see the table above) is determined by ⌊K/4⌋ strings of 3 binary-0, followed by a single binary-1. The length of Sequence A is thus P0=3⌊K/4⌋+1. Sequence B is like Sequence A but ends with {0, 1}, rather than {1}. Sequence B thus has a length of P1=3⌊K/4⌋+2. Sequence C has an initial sequence ending with {0,0,1} and has added a binary-1 ("iteration tail"), resulting in a final portion being {0, 0, 1, 1} and thus P2=3⌊K/4⌋+4. Sequence D has an initial sequence ending with {0, 0, 0, 1} and replaces this sequence with {0, 0, 1, 0, 1} (the iteration tail being interpreted as the final 0, 1), and thus P2=3 ⌊K/4⌋+5. The remainder of 5 is the length of the sequence {0, 0, 1, 0, 1}.

In a second iteration, the rules of Table 1 are applied to the output of the first iteration. There are four possibilities, depending on the value of K mod 4. One may think of K mod 4 as the number of extra binary-0 which did not exactly fit into a group of 4 binary-0.

| | | |
|---|---|---|
| $E\left(E\left(\{0, \ldots, 0, 1\} \in Z_2^{1\times(K+1)}\right)\right) = \{$ | E (Sequence A) | for K mod 4 = 0 |
| | E (Sequence B) | for K mod 4 = 1 |
| | E (Sequence C) | for K mod 4 = 2 |
| | E (Sequence D) | for K mod 4 = 3 |

Superposition can be applied to Sequence C and Sequence D resulting in the following.

| | First string | Second string | |
|---|---|---|---|
| $E\left(E\left(\{0, \ldots, 0, 1\} \in Z_2^{1\times(K+1)}\right)\right) = \{$ | E (Sequence A) | None | for K mod 4 = 0 |
| | E (Sequence B) | None | for K mod 4 = 1 |
| | $E\left(\{0, \ldots, 0, 1\} \in Z_2^{1\times P4}\right)$ | E({1}) | for K mod 4 = 2 |
| | $E\left(\{0, \ldots, 0, 1\} \in Z_2^{1\times P4}\right)$ | E({0, 1}) | for K mod 4 = 3 |

Where P4=3 $\lfloor K/4 \rfloor$+3.

Applying E4 and E3 of Table 1 to the processing of Sequence C and Sequence D, respectively, the second string is simplified, resulting in the following result of the second iteration.

| | First string | Second string | |
|---|---|---|---|
| $E\left(E\left(\{0, \ldots, 0, 1\} \in Z_2^{1\times(K+1)}\right)\right) = \{$ | E (Sequence A) | None | for K mod 4 = 0 |
| | E (Sequence B) | None | for K mod 4 = 1 |
| | $E\left(\{0, \ldots, 0, 1\} \in Z_2^{1\times P4}\right)$ | {1} | for K mod 4 = 2 |
| | $E\left(\{0, \ldots, 0, 1\} \in Z_2^{1\times P4}\right)$ | {0, 1} | for K mod 4 = 3 |

The last result illustrates the strength of the map of Table 1 while it operates recursively. Based on superposition and the fact that {1} and {0, 1} are fixed values of the map E(·), the iteration tail of the previous iteration is also fixed and is not affected by the next iteration (see the second string above for Sequence C and Sequence D).

This results in an overlapping sub-problem for which the length of binary-0s before the binary-1 is K'=3 $\lfloor K/4 \rfloor$+B (where B is an element of the set {0,1,2,3}) and K' is the new length of the of the binary-0 sequence to be processed at the next iteration.

If, for example, in another map, an iteration tail of the first iteration was badly affected by the second iteration (increasing its size with some probability larger than 0), then, the compression performance would be worse than the map E(·) of Table 1, due to the nature of recursion (propagation of bad effects).

For the map E(·) of Table 1, the multiple iteration process shrinks the initial input effectively up to some point where K=3 (the string of binary-0 left in the processed string is 3 binary-0s). From that point, each further iteration will increase the size of the sequence by one bit. See the following example applying the map E(·) of Table 1 below.

Example 4

The initial sequence is $\{0, 0, 0, 0, 0, 0, 1\} \in Z_2^{1\times 7}$.

| Iteration | Input sequence | Output sequence = E (input sequence) |
|---|---|---|
| 1 | $\{0, 0, 0, 0, 0, 0, 1\} \in Z_2^{1\times 7}$ | $\{0, 0, 0, 0, 0, 1, 1\} \in Z_2^{1\times 7}$ |
| 2 | $\{0, 0, 0, 0, 0, 1, 1\} \in Z_2^{1\times 7}$ | $\{0, 0, 0, 0, 1, 1\} \in Z_2^{1\times 6}$ |

-continued

| Iteration | Input sequence | Output sequence = E (input sequence) |
|---|---|---|
| 3 (best) | $\{0, 0, 0, 0, 1, 1\} \in Z_2^{1\times 6}$ | $\{0, 0, 0, 1, 1\} \in Z_2^{1\times 5}$ |
| 4 | $\{0, 0, 0, 1, 1\} \in Z_2^{1\times 5}$ | $\{0, 0, 1, 0, 1, 1\} \in Z_2^{1\times 6}$ |
| 5 | $\{0, 0, 1, 0, 1, 1\} \in Z_2^{1\times 6}$ | $\{0, 0, 1, 1, 0, 1, 1\} \in Z_2^{1\times 7}$ |
| 6 | $\{0, 0, 1, 1, 0, 1, 1\} \in Z_2^{1\times 7}$ | $\{0, 0, 1, 1, 1, 0, 1, 1\} \in Z_2^{1\times 8}$ |
| 7 | $\{0, 0, 1, 1, 1, 0, 1, 1\} \in Z_2^{1\times 8}$ | $\{0, 0, 1, 1, 1, 1, 0, 1, 1\} \in Z_2^{1\times 9}$ |

In Example 4, the shortest sequence is obtained after the third iteration.

The sequence {1, 0, 1, 1} existing at the end of the sequence after iteration four is static and does not change in subsequent iterations.

Compression For Binary-1 Near Each Other

For the map E(·) of Table 1, the sequences {1} and {0,1} are fixed value (no compression, no expansion). Consider a sequence with consecutive binary-1s (a burst). The pattern {1,1,0,1} may be referred to as a fake iteration tail with respect to the map E(·) of Table 1. The fake iteration tail is referred to as a fixed bit sequence (FBS).

In Example 5, the FBS {1, 1, 0, 1} is appended to the initial sequence to give a new initial sequence for consideration. Example 5 illustrates a compression example with a burst of binary-1s.

Example 5

The initial sequence is $$\{0, 0, 0, 0, 0, 0, 1, 1, 1, 0, 1\} \in Z_2^{1\times 11}.$$

| Iteration | Input sequence | Output sequence = E (input sequence) |
|---|---|---|
| 1 | $\{0, 0, 0, 0, 0, 0, 1, 1, 1, 0, 1\} \in Z_2^{1\times 11}$ | $\{0, 0, 0, 0, 0, 1, 1, 1, 1, 0, 1\} \in Z_2^{1\times 11}$ |
| 2 | {0, 0, 0, 0, 0, 1, 1, 1, 1, 0, 1} | $\{0, 0, 0, 0, 1, 1, 1, 1, 0, 1\} \in Z_2^{1\times 10}$ |
| 3 (best) | {0, 0, 0, 0, 1, 1, 1, 1, 0, 1} | $\{0, 0, 0, 1, 1, 1, 1, 0, 1\} \in Z_2^{1\times 9}$ |
| 4 | {0, 0, 0, 1, 1, 1, 1, 0, 1} | $\{0, 0, 1, 0, 1, 1, 1, 1, 0, 1\} \in Z_2^{1\times 10}$ |
| 5 | {0, 0, 1, 0, 1, 1, 1, 1, 0, 1} | $\{0, 0, 1, 1, 0, 1, 1, 1, 1, 0, 1\} \in Z_2^{1\times 11}$ |
| 6 | {0, 0, 1, 1, 0, 1, 1, 1, 1, 0, 1} | $\{0, 0, 1, 1, 1, 0, 1, 1, 1, 1, 0, 1\} \in Z_2^{1\times 12}$ |
| 7 | {0, 0, 1, 1, 1, 0, 1, 1, 1, 1, 0, 1} | $\{0, 0, 1, 1, 1, 1, 0, 1, 1, 1, 1, 0, 1\} \in Z_2^{1\times 13}$ |

In Example 5, the cost of representing a sequence of BPs (single line cluster BPs) is similar to representing the first BPs plus the size of the cluster. In Example 5, four BPs are represented by 9 bits (see the result of the third iteration).

Comparative techniques of the index/coordinate list method and the index differences method, applied to the sequence of Example 5, require 12 bits (a fixed 3 bits per BP). In Example 5, the appended FBS, {1,1,0,1}, remain unchanged across the iterations as expected.

Handling with Generic Inputs, Decompression Process

The map E(·) of Table 1 is configured to process each binary sequence which ends with a binary-1. In order to generalize this processing, a binary-1 can be appended to the end of the input before the first iteration and remove the binary-1 after the decompression process. The decompression process is based on the map E(·) of Table 1 being a bijective map. A bijective map is a function between two sets. Each element of one set is paired with exactly one element of the other set. The decompression method of map E(·) of Table 1, denoted $E^{-1}(\cdot)$, is as follows.

TABLE 2

(the decompression rules of Algorithm 1)

| Operation (performed by $E^{-1}(\cdot)$) | Input (from input buffer 200) | Output (to output buffer 240) | Note |
|---|---|---|---|
| $E1^{-1}$ | {0, 0, 0} | {0, 0, 0, 0} | Replace {0, 0, 0} with {0, 0, 0, 0}; expansion |
| $E2^{-1}$ | {0, 0, 1} | {0, 0} | Replace {0, 0, 1} with {0, 0}; drop a binary-1 |
| $E3^{-1}$ | {0, 1} | {0, 1} | Copy {0, 1} to {0, 1} |
| $E4^{-1}$ | {1} | {1} | Copy {1} to {1} |

Table 2 provides the inverse operations for use in the inverse of replacement operator of FIG. 1B.

Performance Example with a Large K, Example 6

In this example, K=699,050. The initial sequence is 699,050 binary-0s followed by a single binary-1. The initial sequence is an element of $$Z_2^{1\times 699051}.$$

Recursively applying the map E(·) of Table 1, starting from the initial sequence of 699,050 binary-0s followed by a single binary-1 has the following behavior, indicated at sample iteration counts.

| Iteration | Length of Representation | comment |
|---|---|---|
| 0 | 699,051 | initial |
| 20 | 2225 | Geometric decline by $(3/4)^{20} = 0.00317$ |
| 44 | 31 | best |
| 100 | 87 | Linear increase (growing by one bit each iteration) |

Figure 5:
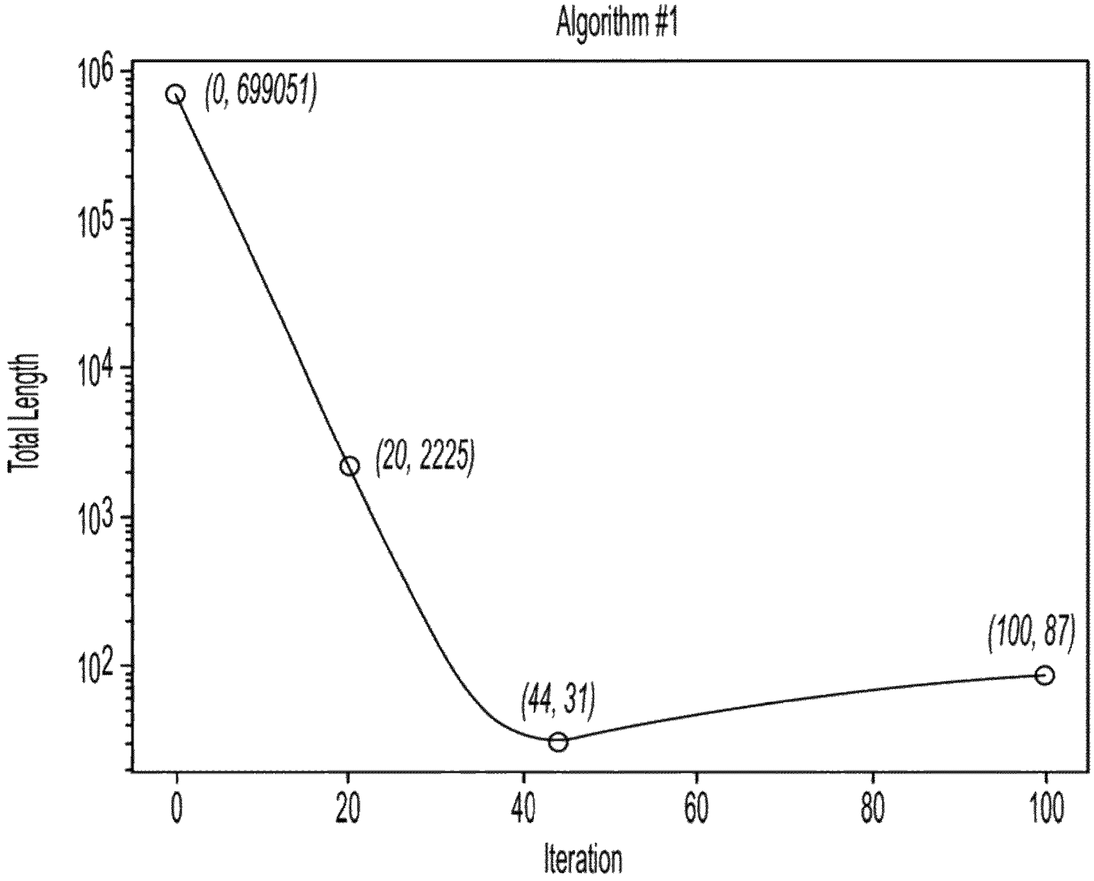
FIG. 5 illustrates an amount of compression with respect to iterations performed by an example recursive algorithm (Algorithm 1), according to an exemplary embodiment.

For this performance expressed as a plot, see FIG. 5. The representation after 44 iterations is $$\{0, 0, 0, 1, 1, 1, 0, 1, 1, 0, 1, 1, 0, 1, 1, 0, 1, 1, 0, 1, 0, 1, 0, 1, 0, 1, 0, 1, 1, 1, 1\} \in Z_2^{1\times 31}.$$

In the early iterations, the improvement is approximately linear (in logarithmic scale) which shows a geometric shrinking. Geometric shrinking is a linear behavior αx+b in y-logarithmic scale is equivalent to $10^{\alpha x+b}$ in base 10 or $(10^b)(10^\alpha)^x=B\cdot A^x$.

A linear approximation between (0, 699051) and (20, 2225) provides:

$A=10^Y=0.7501378125490381$ $$\text{where } \gamma = \frac{\log_{10}(2225) - \log_{10}(699051)}{20-0}$$

$B=10\wedge(\log_{10}(699051))\cdot A\wedge 0=699051$

The geometric shrinking factor is 0.75 as expected.

After reaching the minimal representation length, the sequence grows by one bit on each iteration: 100−44=87−31=56. This is an important fact, since in practice, the sparse sequence can be represented as many concatenated subsections in the structure of $$\{0, \ldots, 0, 1\} \in Z_2^{1\times K_i} \text{ for } i \in [0, N)$$

where N is the number of binary-1 in the complete sequence and in the general case we may probably get that ∀i<N, ∀j<N, $K_i \neq K_j$ for i≠j. Since each $K_i$ may require a different number of iterations to reach its minimal compressed form, it is probable that during the compression of the complete sparse sequence, some of the subsections will be over-compressed as in the iterations 32 to 87 of Example 6. Some of the subsections will be under-compressed as in iterations 1 to 30 of Example 6. In that situation, the best compressed form of the complete sequence will be a compromise between all subsections. Therefore, it is important that, for the map E(·) of Table 1, each sub-sequence has an geometric shrinkage in the under-compressed region and a low linear expansion in the over-compressed region. For example, expansion of 1-bit per iteration, per sub-sequence. Mathematically, then, in the global minimal compressed form of the complete sequence, the compressed form lengths of most of the sub-sequences will be very close to (but not necessarily equal to) their own global minimum.

In practice, this is a better result than other maps in which both under-compressed and over-compressed regions will have the same shrinkage/expansion behavior (geometric or linear) but with different factors. The factors for the map E(·) of Table 1 are geometric shrinkage of 0.75 per iteration in the geometric region and linear increase of 1 bit per iteration in the linear region.

Stopping Condition

Since the algorithm uses the map E(·) of Table 1 to iteratively compress a given sequence, it also requires a stopping condition. In Example 6, it is apparent by inspection that there is a clear global minimum point in the behavior of the total length as a function of the iteration. This implies the stopping condition: continue iterating $K_{opt}+1$ times until the total length, begins to increase, and then take the last compressed sequence corresponding to the $k_{opt}^{th}$ iteration.

Algorithm 2: Processing a Matrix Using a Recursive Algorithm with Multiple Bijective Maps Generally, the initial input sequence 110 may be composed of rows of a matrix. For example, the input stream may be a first row of a matrix, a second row of the matrix and so on to a last row. The first bit of the initial input sequence 110 is the first bit of the first row, followed by the second bit of the first row, and so on to the last bit of the first row. The next bit of the initial input sequence 110 is the first bit of the second row, followed by the second bit of the second row, and so on. This continues for the other rows through the last row. The last bit of the initial input sequence 110 is the last bit of the last row.

The compression circuit of FIG. 1A implements Algorithm 2 as well as Algorithm 1. The difference is in the maps which are applied in S102. Algorithm 2 is made up of three operations M 1, M 2 and M 3. These operations implement word replacement maps. M 1, M 2 and M 3 are referred to respectively as "compress," "copy" and "fixed bit sequence handling."

The recursive compression system is made of up of N instances, each instance implementing Table 3 (discussed below). Each instance may also be referred to as a kth recursion or a kth iteration. The left most instance obtains its input from the initial input sequence 110 or from the flattening operation (discussed below). The right most instance provides passing through its output buffer 203 the compressed output sequence 115.

Referring to FIG. 3, the leftmost instance obtains bits from the input terminal, processes them according to rules for the word replacement maps, and outputs bits to an output buffer 203. In general, the output buffer 203 of the kth recursion is identical with the input buffer 201 of an (k+1)th recursion. The input buffer 201 of the leftmost instance is refilled by obtaining bits from the input terminal.

Figure 4:
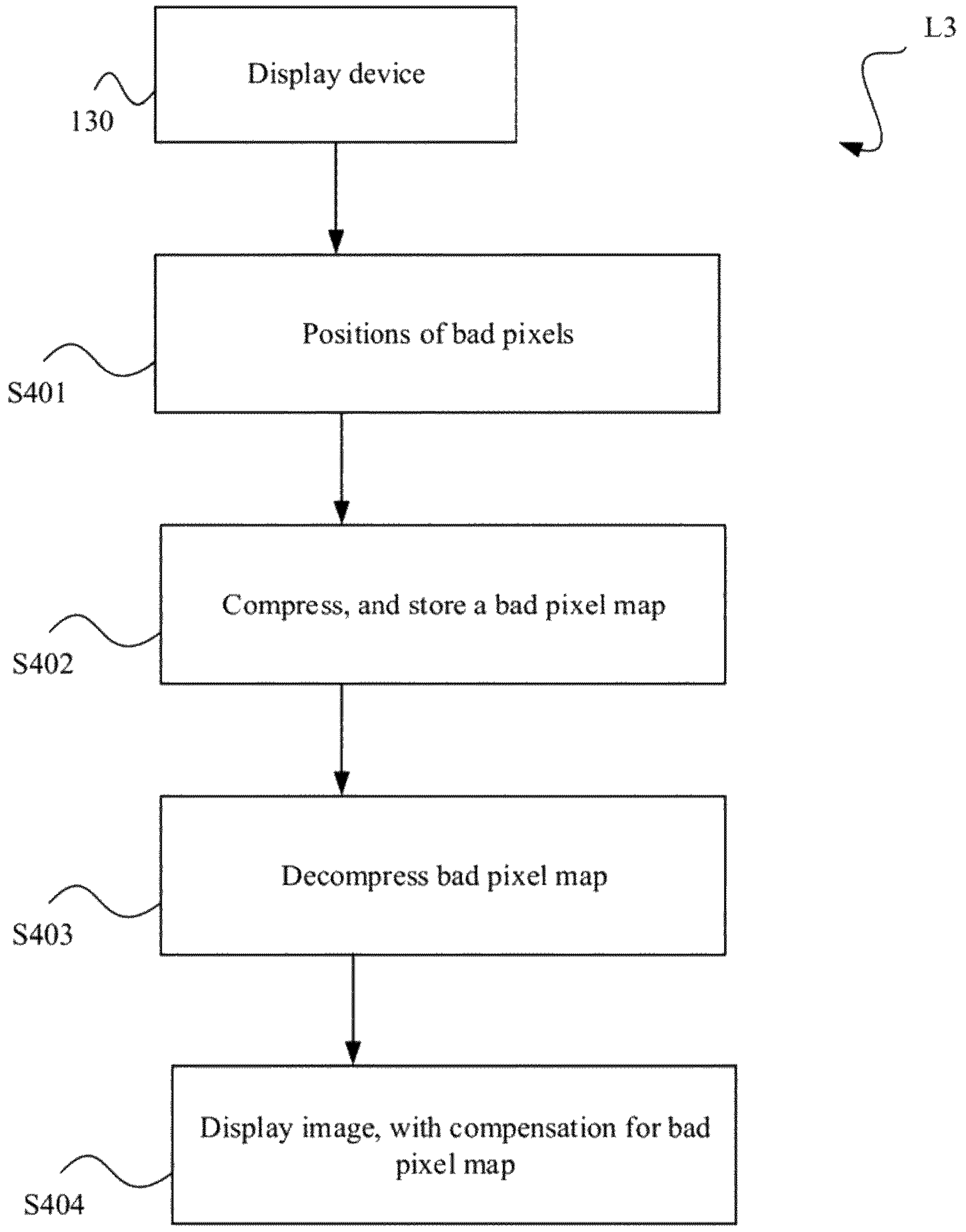
FIG. 4 illustrates use of the recursive algorithm of FIG. 1 in the context of bad pixels in a display device, according to an exemplary embodiment.

FIG. 4 illustrates an application of the recursive compression system of FIG. 1A and the recursive decompression system of FIG. 1B. FIG. 4 illustrates a display device from which positions of bad pixels are learned (operation S401). The bad pixel information is then compressed at S402 (using FIG. 1A) and stored. At some later time, the bad pixel map is needed, and the compressed output sequence is decompressed at S403 (using FIG. 1B). Based on the recovered bad pixel map, an image is then displayed, S404.

The rules for the word replacement maps are as follows. The recursion starts with M 2. The current iteration is "k". For example, on the first iteration k-1 is 0, and M 2 is skipped when k=1.

The operator performing one iteration of Algorithm 2 is referred to as M(·).

M(·) is realized by three operations, M 1, M 2 and M 3. M 1 performs direct compression of sequences of binary-0s. M 2 is a copy operation. M 3 handles fixed bit sequences. An example realization of M(·) is shown in Table 3.

TABLE 3

(the rules of Algorithm 2)

| Operation (performed by M (·), also referred to as mode map or map) | Input (from input buffer 200) | Output (to output buffer 240) | Note |
|---|---|---|---|
| M 1 | {0, 0} | {0} | Replace {0, 0} with {0}, 50% reduction |
| M 1 | {0, 1} | {1,1} | Replace {0, 1} with {1, 1} and switch to M 2 |

TABLE 3-continued (the rules of Algorithm 2)

| Operation (performed by M (·), also referred to as mode map or map) | Input (from input buffer 200) | Output (to output buffer 240) | Note |
|---|---|---|---|
| M 1 | {1} | {1, 0} | Single 1 is expanded (ie replace {1} with {1, 0}), switch to M 2 |
| M 2 | {0} | {0} | |
| M 2 | {1} | {1} | Stay in M 2 for k-1 copy operations, where k is the iteration value |
| M 3 | {0, 0} | {0, 0} | After observing {0, 0} while in M 3 and copying it, switch to M 1 |
| M 3 | {0, 1} | {0, 1} | Perform a copy operation, stay in M 3. |
| M 3 | {1} | {1} | Perform a copy operation, stay in M 3. |

In Table 3, encountering the input sequence {0,0} while in M 2 is referred to as the reset sequence, since it resets the system operation back to the first mode map M 1.

The process on each binary sequence starts from M 3.

In Table 3, M 1 is shrinking binary-0 sequences while M 1 and M 3 simply copies input to output. An example is provided below.

Figure 2:
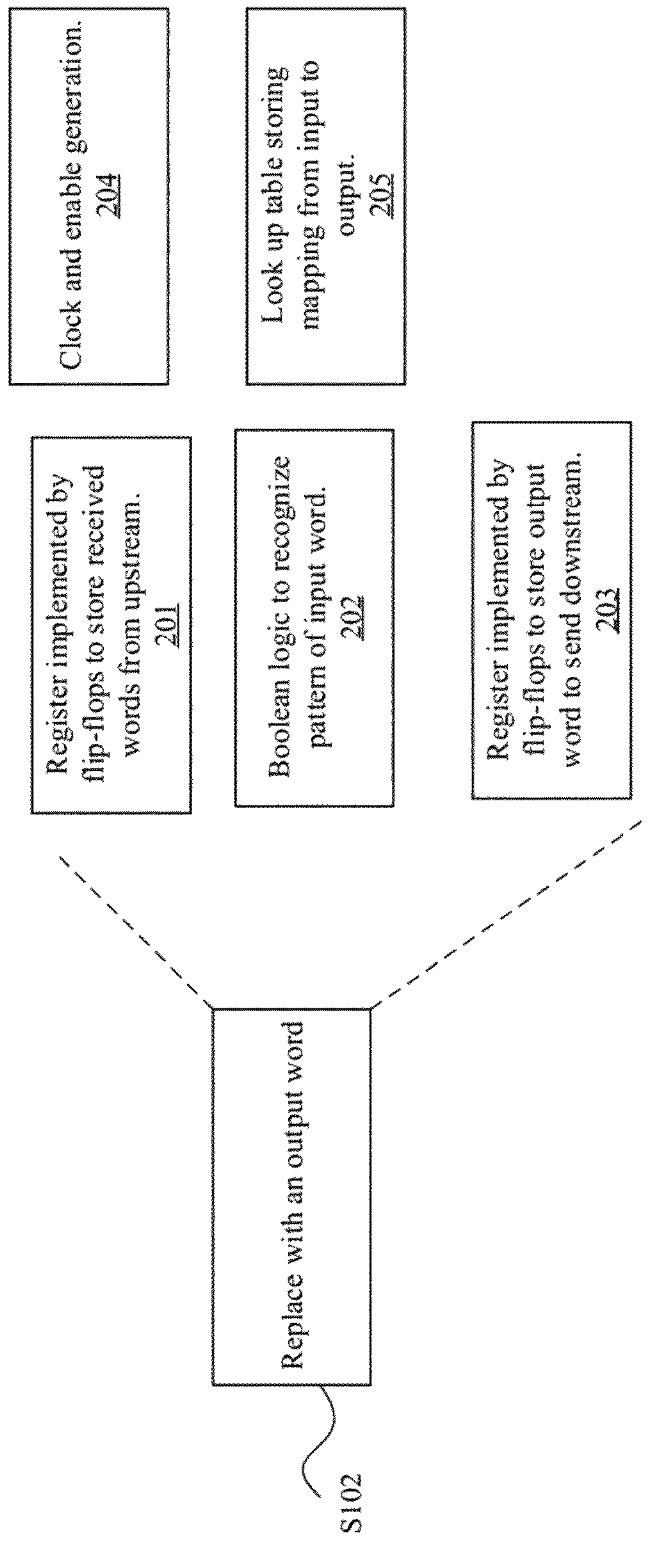
FIG. 2 illustrates an example of hardware components used in implementing a replace function of the recursive algorithm of FIG. 1, according to an exemplary embodiment.

Algorithm 2 starts at M 3. The word replacement shown in Table 3 is performed outputting {0,0}, {0,1} or {1} to the output buffer 203 (in case of hardware implementation, see FIG. 2). The logic then always flows from M 3 to M 1. At M 1, bits are obtained from the Algorithm 2 instance to the left of the present instance. For the Algorithm 1 instance, the input bits are obtained from input buffer 201, and the word replacement shown in Table 3 is performed. The output is {0}, {1,0} or {0,1}. After a binary-1 is encountered in the input buffer 201, the logic flows to M 2. At the kth iteration, M 2 is performed k-1 times. M 2 copies its input to its output.

After any of operations M 1, M 2 or M 3, the input buffer is augmented from the left with bits from the Algorithm 2 instance to the left (from the initial input sequence 110 for the first instance of Algorithm 2). When the input stream is exhausted and the input buffer 201 of the first Algorithm 2 instance is empty, the first Algorithm 2 instance stops. From left to right the bits make their way through the Algorithm 2 instances until the last (rightmost) Algorithm 2 instance empties its input buffer 201. The compressed output sequence 115 is the sequence of bits observed output by the rightmost Algorithm 2 instance to its output buffer 203.

Example 1

As an example, let initial input sequence 110 be the sequence {0,0,0,0,1,1,0,0,0,1}. This is a binary sequence of length 10. In field notation this sequence is an element of $$Z_2^{\{1\times 10\}}.$$

The recursion using Table 1 parses this sequence as follows.

First Iteration of Example 1, Algorithm 2

| Parsing | M 3({0, 0}) | M 1({0, 0}) | M 1({1}) | M 3({1}) | M 3({0, 0}) | M 1({0, 1}) |
|---|---|---|---|---|---|---|
| Note | reset | Shrink 50% | | | reset | |
| Result of word replacement | {0, 0} | {0} | {1, 0} | {1} | {0, 0} | {1, 1} |

The output sequence of this single iteration is {0,0,0,1,0, 1,0,0,1,1} which is an element of $$Z_2^{\{1\times 10\}}.$$

For the first iteration, the process starts with M 3. Since M 3 is applied to {0,0}, the process resets to M 1. M 1 is applied successively until a {1} is encountered, at which time operation switches to M 2, but this is the first iteration (k=1) and M 2 is only visited for k-1 times, so M 2 is skipped, and the process moves directly to M 3. M 3 is applied successively until {0,0} is encountered and then the process flows to M 1.

Those values caused by the process operating on a binary-1 are referred to as an iteration table. A bove, iteration tail values are marked in bold and with a larger font size.

Continuing the example, the second iteration is applied to the output of the first iteration.

Second Iteration of Example 1, Algorithm 2

| Parsing | M 3({0, 0}) | M 1({0, 1}) | M 2({0}) | M 3({1}) | M 3({0, 0}) | M 1({1}) | M 2{1} |
|---|---|---|---|---|---|---|---|
| Note | reset | | | | reset | | |
| Result of | {0, 0} | {1, 1} | {0} | {1} | {0, 0} | {1, 0} | {1} |

-continued

| Parsing | M 3({0, 0}) | M 1({0, 1}) | M 2({0}) | M 3({1}) | M 3({0, 0}) | M 1({1}) | M 2{1} |
|---|---|---|---|---|---|---|---|
| word replacement | | | | | | | |
| Switching between mode maps | To M 3 | First {1} to M 1, following {1, 0} to M 2 | | To M 3 | To M 3 | The first {1} to M 1, the following {0, 1} to M 2 | |

A bove, iteration tail values are marked in bold and with a larger font size.

The output sequence of the second iteration is {0,0,1,1, 0,1,0,0,1,0,1} which is an element of $$Z_2^{(1\times 11)}.$$

Based on the example above, Table 3 and the logic 300, with every iteration the iteration tail grows by 1 with probability 1. This general statement implies that M 2 performing a copy bit by bit k-1 times will lead to the same effect as in Algorithm 1, which was not affected adversely by iteration tails from one iteration to the next. Each overall sequence can then be considered as a juxtaposition of sub-problems between every two binary-1s (BPs).

In Example 1 of Algorithm 2, the input sequence was not shrunk between the iterations, rather has grown. This is because the initial sequence of this example is already optimized in the sense of M 2. This initial sequence was chosen to demonstrate the map switching during the process.

Fixed Bit Sequences Support

There are alternatives for implementation of operation M 3 of Table 3.

In one embodiment, M 3 is not used; rather, the process flows to M 1 after applying M 2 k-1 times.

A strength of Algorithm 1, E(·), is that the output sequence does not expand for clusters of near binary-1s (cluster BPs). In Algorithm 2, operation M 3 preserves this strength. To generalize this effect, the distance between binary 1s is referred to as d0. In Table 3 of Algorithm 2, the supported FBS with maximal distance between binary-1s is 1. Thus, for M 3, d0=1. Unlike in Algorithm 1, the Algorithm 2 has flexibility to change and select different maps M 3 to provide different values of do.

In Table 4, Algorithm 2 is modified to provide zero maximal distance between binary-1s (d0=0).

TABLE 4

| d0 = 0 | | | |
|---|---|---|---|
| Change to Algorithm 2 | Input | Output | Note |
| M3' | {0} | {0} | After copy operation, switch to M 2 |
| M3' | {1} | {1} | Stay in M3' |

TABLE 5

| d0 = 2 | | | |
|---|---|---|---|
| Change to Algorithm 2 | Input | Output | Note |
| M3" | {0, 0, 0} | {0, 0, 0} | After copy operation, switch to M 2 |
| M3" | {0, 0, 1} | {0, 0, 1} | Stay in M3" |
| M3" | {0, 1} | {0, 1} | Stay in M3" |
| M3" | {1} | {1} | Stay in M3" |

As shown in Table 4, M3' is used to implement FBS with zero maximal distance between binary-1 (d0=0).

As shown in Table 5, M3" is used to implement FBS with a maximal distance between binary-1s of 2 (d0=2).

The set of FB Ss are different between each optimal map for M 3 as can be seen below.

TABLE 6

| configuration | Set of Realized FBSs |
|---|---|
| M 3 with d0 = 1 | {1}, {1, 1}, {1, 1, 1}, {1, 0, 1}, {1, 1, 1, 1}, {1, 0, 1, 1}, {1, 1, 0, 1}, {1, 1, 1, 1, 1}, . . . |
| M3' with d0 = 0 | {1}, {1, 1}, {1, 1, 1}, {1, 1, 1, 1}, {1, 1, 1, 1, 1}, {1, 1, 1, 1, 1, 1}, {1, 1, 1, 1, 1, 1, 1}, {1, 1, 1, 1, 1, 1, 1, 1}, . . . |
| M3" with d0 = 2 | {1}, {1, 1}, {1, 1, 1}, {1, 0, 1}, {1, 1, 1, 1}, {1, 0, 1, 1}, {1, 1, 0, 1}, {1, 0, 0, 1}, . . . |

Where a map M 3 has a larger do, its corresponding FB Ss will be shorter for the same index in the set, where the set is indicated by the second column in Table 6.

When the value of do is changed, the length of the reset sequence is changed accordingly and is equal to $$\{0, \ldots, 0\} \in Z_2^{1\times(d0+1)}.$$

As seen in Table 3, the reset sequence is a prefix in each compressed form of $$\{0, \ldots, 0\} \in Z_2^{1\times K}.$$

The reset sequence has global effect on the compression ratio.

Considering again the second iteration of Example 1, Algorithm 2. Similarly to Algorithm 1, Algorithm 2 is able to perform superposition of an input sequence. Without loss generality, it is only needed to consider sub-sequences between binary-1s. Considering a sequence of binary-0 of length K with a single following binary-1, the first iteration of Algorithm 2 (using Table 3) produces the following (for K≥2).

Where $t_m = K_{m-1} \bmod 2$, $K_m = [K_{m-1}/2]$, $K_0 = K-2$, m>0 is the iteration number, K is the length of binary-0 sequences before the first iteration, $$\{b_1, \ldots, b_{n_K}\} \in Z_2^{1\times n_K}$$

is an FBS according to M 3, $P3 = 2+K_{m-1}+1+(m-1)+n_k$, and $P4 = 2+K_m+1+m+n_k$.

If the equation pair $b_i = V_i \bmod 2$, $V_i = [V_{i-1}/2] = V_{i-1} >> 1$ is applied N times on some given integer $V_0$, the sequence $b_i$ (with i ranging from 0 to N−1) will be exactly the N LSB bits of the binary representation of $V_0$, where $V_N$ is the residual of this partial numeric-to-binary conversion process.

Therefore, the iteration tail after m iterations will be the m LSB bits of the binary representation of K-2.

This is useful in implementation, since the m iterations can be performed in a single step.

$$M_2^{[m]}\{\ldots M_2^{[1]}\{0, \ldots, 0, 1, b_1, \ldots, b_{n_K}\} \in Z_2^{1\times K+1+n_K}\} \ldots\} = \{0, 0, 0, \ldots, 0, 1, t_m, \ldots, t_1, b_1, \ldots, b_{n_K}\} \in Z_2^{1\times P1},$$

Where $P1 = 3+K_m+m+n_k$, $t_m = K_m \bmod 2$

| | Parsing first 2 bits | Parsing next 2 bits | Parsing intermediate pairs of binary - 0s | Parsing final pair of binary - 0s | Parsing final 1 or 2 bits | |
|---|---|---|---|---|---|---|
| $M(\{0, \ldots, 0, 1\} \in Z_2^{1\times(K+1)}) =$ | M 3({0, 0}) | M 1({0, 0}) | . . . | M 1({0, 0}) | M 1({1}) | For (K − 2) mod 2 = 0 |
| | | | | | M 1({0, 1}) | For (K − 2) mod 2 = 1 |
| $M(\{0, \ldots, 0, 1\} \in Z_2^{1\times(K+1)}) =$ | {0, 0} | $\{0, \ldots, 0\} \in Z_2^{1\times\lfloor\frac{K-2}{2}\rfloor}$ | | | {1, 0} | For (K − 2) mod 2 = 0 |
| | | | | | {1, 1} | For (K − 2) mod 2 = 1 |
| $M(\{0, \ldots, 0, 1\} \in Z_2^{1\times(K+1)}) =$ | $\{0, \ldots, 0, 1, 0\} \in Z_2^{1\times P1}$ for $(K-2) \bmod 2 = 0$ | | | | | |
| $M(\{0, \ldots, 0, 1\} \in Z_2^{1\times(K+1)}) =$ | $\{0, \ldots, 0, 1, 1\} \in Z_2^{1\times P2}$ for $(K-2) \bmod 2 = 1$ | | | | | |

$$\text{Where } P1 = P2 = \begin{cases} \left\lfloor \frac{K}{2} \right\rfloor + 3 & \text{for } K \geq 2 \\ K+1 & \text{for } 0 \leq K < 2 \end{cases}$$

The iteration tail grows by 1 bit with probability 1 (in bold font) each iteration (due to M 2 that operated on the tail). The length of the binary-0 sequence will be reduced by approximately 50% in each iteration (compared to 25% reduction in Algorithm 1).

In the following, the iteration is referred to with the index m.

For the general case, see Equation 1 below.

$$M^{[m]}\{0, 0, 0, \ldots, 0, 1, t_{m-1}, \ldots, t_1, b_1, \ldots, b_{n_K}\} \in Z_2^{P3}\} = \{0, 0, 0, \ldots, 0, 1, t_m, t_{m-1}, \ldots t_1, b_1, \ldots, b_{n_K}\} \in Z_2^{P4} \quad \text{Equation 1}$$

Where $$K_m = \left\lfloor \frac{K_{m-1}}{2} \right\rfloor \text{ and } K_0 = K - 2.$$

Example 2

Similarly to Example 2 of Algorithm 1, consider 699,050 binary-0s followed by a single binary-1.

| Iteration | Length of Representation | comment |
|---|---|---|
| 0 | 699,051 | initial |
| 10 | 695 | Geometric decline by $(1/2)^{10} = 0.000976$ |
| 18 | 23 | best |
| 100 | 103 | Linear increase (growing by one bit each iteration) |

The output sequence is of length 23 after 18 iterations, and is the following sequence: {0, 0, 0, 0, 1, 1, 0, 1, 0, 1, 0, 1, 0, 1, 0, 1, 0, 1, 0, 1, 0, 0, 0} (iteration tail values are marked in bold and with a larger font size. in the processed sequence). The 18 bits in bold are the iteration tail after 18 iterations. Those 18 bits are exactly the 18 LSB bits of K−2=699050-2=699048=(in base 2) 10101010101010101000.

A=$10^{Y}$=0.5008960354834865

$$\text{where } \gamma = \frac{\log_{10}(695) - \log_{10}(699051)}{10 - 0}$$

B=10/\($\log_{10}$ (699051))·A/\0=699051

The geometric shrinking factor is 0.50 as expected.

After 23 iterations, as an example, the output sequence is: {0, 0, 1, 0, 0, 0, 1, 0, 1, 0, 1, 0, 1, 0, 1, 0, 1, 0, 1, 0, 1, 0, 0, 0} (iteration tail values are marked in bold and with a larger font size. in the processed sequence). This sequence contains all the bits of the integer K−2 with leading zero padding (underlined). This indicates that, using M(·) in case of an over-compressed sequence, the effect will be to zero pad sub-sequences for which the bittage of K−2 (in this example 699,048) for the sub-sequence is smaller than the number of iterations. Bittage refers a number of bits needed to represent a number. If the bittage of K−2 of some sub-sequence is B=[$\log_2$ (K−2)] (in this example 20), m iterations are performed where m>B (in this example 23 iterations), then the padding will be B-m zeros (in this example, 3 zeros).

Decompression

Algorithm 1 uses a single bijective map (see Table 1). Algorithm 2 uses three distinct bijective maps. The output sequence for Algorithm 2 is not unique. The same initial sequence may result in different output sequences depending on which map was applied during compression.

Each map in the process of Algorithm 2 (M 1, M 2 and M 3) is a bijective map. The decompression algorithm uses the same map switching rules in the decompression process which were used in the compression process. Overall, then Algorithm 2 is a bijective process.

The decompression process of M(·) is given below. Begin in M 3-1.

TABLE 7

| | Input | Output | comment |
|---|---|---|---|
| M $1^{-1}$ | {0} | {0, 0} | No switch |
| M $1^{-1}$ | {1, 1} | {0, 1} | Switch to M $2^{-1}$ for (k-1) replacements, then switch to M $3^{-1}$ |
| M $1^{-1}$ | {1, 0} | {1} | |
| M $2^{-1}$ | {0} | {0} | Perform (k-1) replacements |
| M $2^{-1}$ | {1} | {1} | |
| M $3^{-1}$ | {0, 0} | {0,0 } | Switch to M $1^{-1}$ |
| M $3^{-1}$ | {1, 0} | {1, 0} | No switch |
| M $3^{-1}$ | {1} | {1} | No switch |

Table 7 is used in FIG. 1A to realize the decompression of Algorithm 2.

N-dimensional binary-1s

Algorithm 2 performs well with 1 dimensional binary-1s (single-line cluster BPs) by using M 3 with its corresponding do such that there are fixed bit sequences (FBSs) between iterations.

Figure 7:
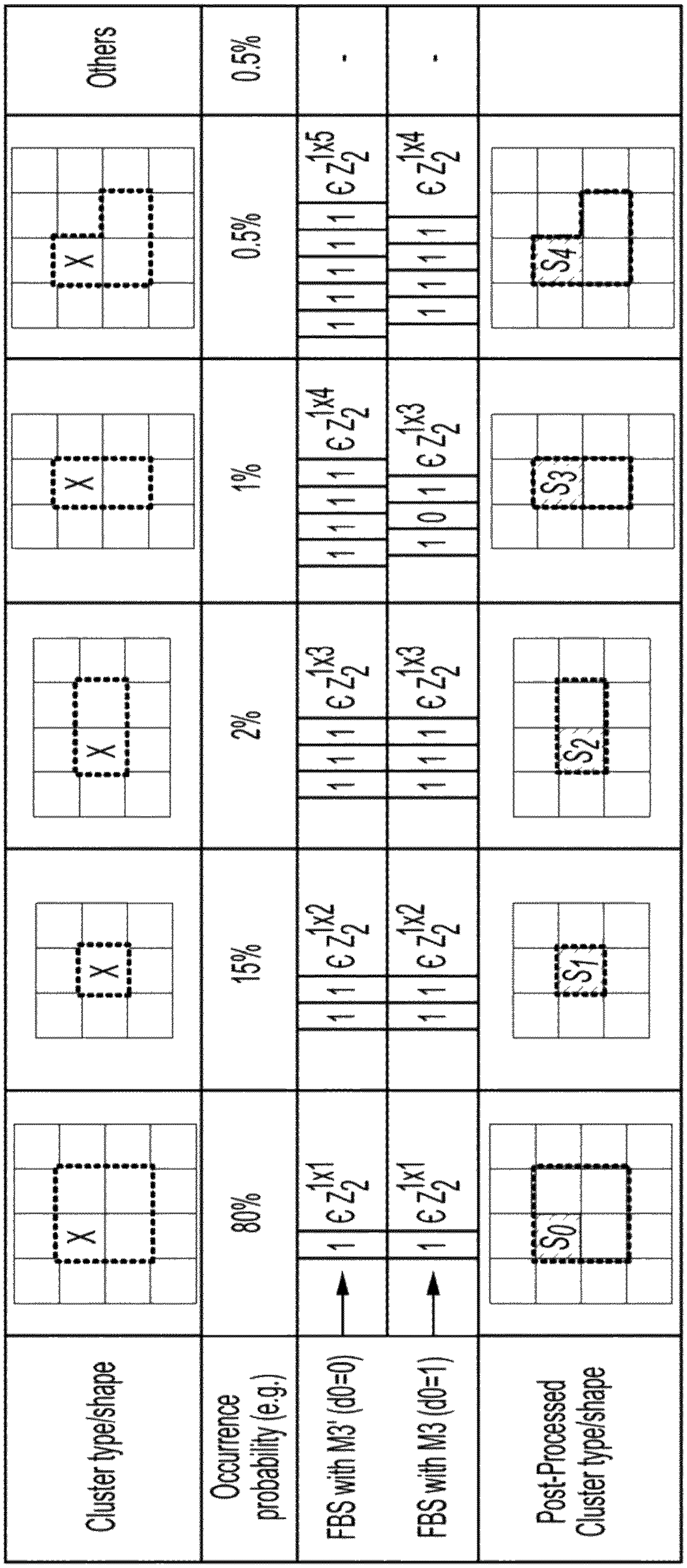
FIG. 7 illustrates flattening an initial input sequence representing a two dimensional array, according to an exemplary embodiment.

In practice, the input data may include N dimensional binary-1s (for example a multi-line cluster of BPs in a binary image). FIG. 7 illustrates examples of various cluster shapes in 2 dimensional data.

Algorithm 2 leverages proximity of 1-dimensional binary-1s to improve compression ratio. To achieve this for N dimensional binary-1s, some embodiments flatten the N-dimensional data to a 1 dimensional sequence.

The flattening is performed by encoding N dimensional binary-1s (a cluster shape) to a unique 1 dimensional fixed bit sequence (FBS). FBS is a sequence remains unchanged across iterations with respect to a selected type of M 3 with a corresponding do.

Similar to Huffman coding techniques, embodiments encode those cluster shapes with a relatively high occurrence probability to a relatively short fixed bit sequence (FBS).

Depending on the M 3 selected, an infinite set of FSBs exist with incremental length. See Table 6. Members of a set are assigned to cluster shapes during pre-processing (the flattening).

Using an M 3 with higher do leads to a set with shorter fixed bit sequences (FB Ss), which is better.

It is also necessary to consider a penalty of using a larger reset sequence, specifically, $$\{0, \ldots, 0\} \text{ in } Z_2^{1\times(d0+1)}$$

to switch back to M 1, which has a global effect on the total compression ratio.

The selection of M 3 considers the input data statistics and the number of possible cluster types or shape variations in the input data. If there only a few shape variations of clusters, for example, 4 cluster shapes in input data containing 1000 clusters, then embodiments user M3' with d0=0. In contrast, the input data includes many shape variations of clusters, for example, 100 cluster shapes in input data containing 1000 clusters with equal probability, then embodiments select M3" with d0=2 or higher. In some embodiments, a large value of do is 2 and a large number of unique cluster shapes is 100 or more per 1000 clusters.

2-Pass Pre-Process Algorithmic Example

The flattening, in one example, proceeds as follows.

In a first pass, the occurrence probability of cluster shapes is determined. The M 3 maps is chosen based on if there are many cluster variations or only a few. A fixed bit sequence (FBS) is then assigned uniquely to each cluster shape, with more likely clusters being assigned a relatively short FBS for the selected M 3 map.

In a second pass, a pre-process replacement is done. In the replacement, an upper left pixel of the cluster shape is labelled with the FBS for that cluster shape. The other pixels are assigned a value of binary-0.

If the occurrence probability of cluster shapes in the input data is known, then the first pass can be skipped and the second pass can be performed in pipeline fashion before the processing of Algorithm 2 in the pipeline.

It is not necessary that every cluster shape is assigned an FBS. For some occurrence probability, the cluster may processed as-is.

For the flattening process, a decoding dictionary is stored with the compressed sequence. The decoding dictionary includes an association between a cluster shape and the assigned FBS.

The single binary-1 (1×1 cluster) is assigned to some unique FBS even if its occurrence probability is below the occurrence probability threshold.

Algorithm 3: M Ode Maps Searching for Successively Longer Sequence of Binary-0

Structure

Algorithm 3 is based on two maps, the first map is like the map M 1 in Algorithm 2, but the second map is different than Algorithm 2. The second map in Algorithm 3 uses the same concept of map M 3 in Algorithm 2 but the second map in Algorithm 3 changes during the compression/decompression process.

The second map in Algorithm 3 starts from a map with d0=0 (equals to M3' in Algorithm 2) for $K_0$ iterations, then the second map in Algorithm 3 switches to a map with d0=1 (similar but not equals to M 3 in Algorithm 2) up to $k_1$ iterations, then it switches again to a map with d0=2 (similar but not equals to M3" in Algorithm 2) up to $K_2$ iterations, and so on . . . . The total number of iterations is $k=K_s$. where 's' is the number of map switches during the process.

In Table 8, the replacement operation for Algorithm 3 is denoted P(·). P1 is a mode map, and P2 is a mode map.

Each time binary-1 is found it triggers a copy operation, the number of copies is a number of map switches during the process.

The number of input bits that are copied is depends on the state of the algorithm. The algorithm checks which map currently active (P1 or P2). The number of copied input bits can also depend on the configuration of the algorithm to (dynamically or pre-selected) switch the map P2 during the process. The number of copied input bits can also depend on how many iterations should be done before each switch. This decision, of how many switches to preform and how many iterations should be done before each switch, is based on the expected distribution of the input data.

Thus, Algorithm 3 is a bijective process based on a first bijective map (P1) and a plurality of bijective maps (the rows in Table 8 labelled P2). The plurality of bijective maps sequentially search for a pattern of binary-0 with increasing length before detecting a binary-1. After a sequence of binary-0 of length s is identified, this is copied, and the mode map at P1 is again used.

Figure 6:
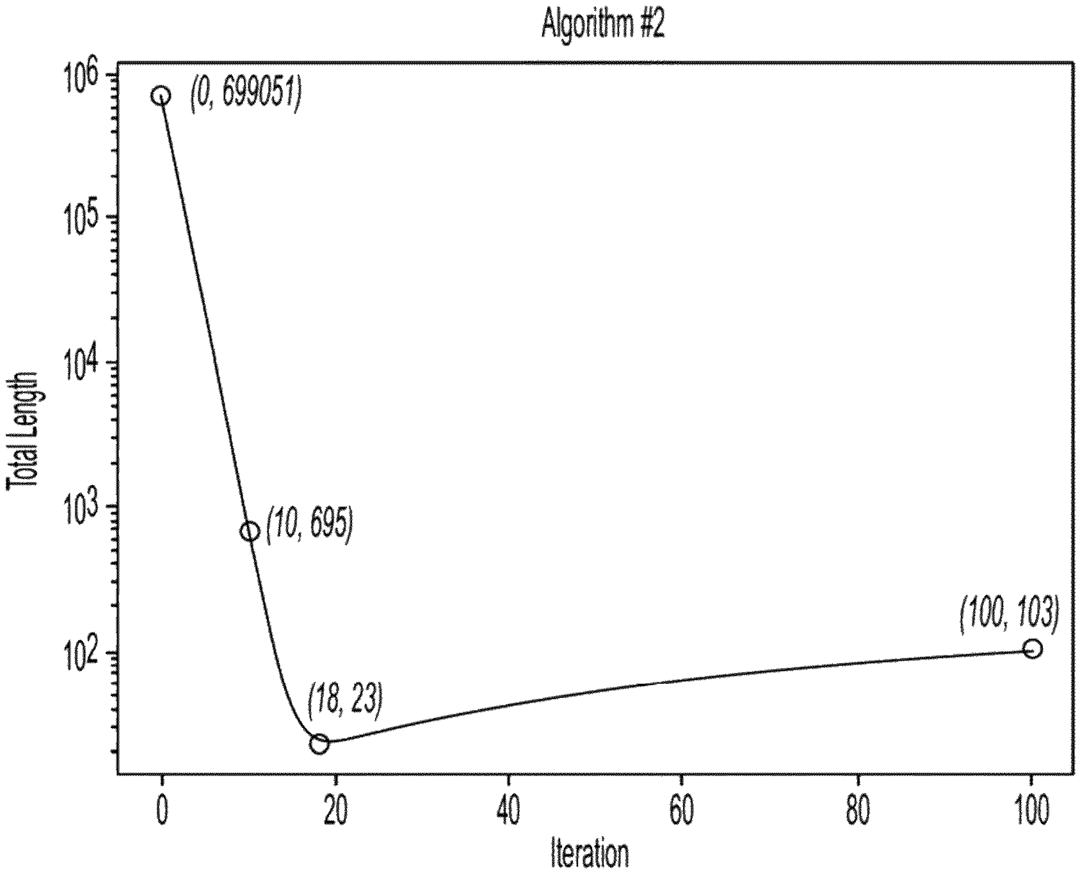
FIG. 6 illustrates an amount of compression with respect to iterations performed by a second example recursive algorithm (Algorithm 2, this curve is also applicable for a particular input sequence for Algorithm 3), according to an exemplary embodiment.

In one circumstance, the compression-rate curve for Algorithm 3 is the same as Algorithm 2 (geometric decline by ½, see FIG. 6) for a single sub-sequence of binary-0 ends with binary-1 as presented in FIG. 6. FIG. 6 does not provide the performance of Algorithm for general sequences with two or more sub-sequences of binary-0 ending with a binary-1.

An added benefit of Algorithm 3 in comparison with Algorithm 2 is the ability of Algorithm 3 ability to handle with more exotic distributions of sub-sequences lengths (number of zeros) in a full data scale-a sparse data that consists of a concatenation of many subsequences in various lengths.

M ap P(1) may be referred to as a compressive map. M ap P(2) may be referred to as a copying map. The fourth row of Table 8 includes the comment "Search for a 1, recognize (s+1) sequential zeroes, copy these to the output, then go to P1." This is a switch between maps. Embodiments include, as indicated at the fourth row of Table 8, switch to a compressive map from a copying map occurs after a detection of a second number of binary-0.

In an example, s and $k_0$, k1, . . . . $K_{s-1}$ (excluding $k_s$) are predetermined parameters chosen based on the expected statistics of the initial input sequence. $k_s$ particularly can be

TABLE 8

(the rules of Algorithm 3)

| Operation (performed by P(·), also referred to as mode map or map) | Input (from input buffer 200) | Output (to output buffer 240) | Note |
|---|---|---|---|
| P1 | {0, 0} | {0} | Replace {0, 0} with {0}, 50% reduction |
| P1 | {0, 1} | {1, 1} | Replace {0, 1} with {1, 1}, copy next k-1 bits from the input to the output and switch to P2 |
| P1 | {1} | {1, 0} | Single 1 is expanded (ie replace {1} with {1, 0}), copy next k-1 bits from the input to the output and switch to P2 |
| P2 | {0, . . . , 0} (s + 1 zeroes) | {0, . . . , 0} (s + 1 zeroes) | Search for a 1, recognize (s + 1) sequential zeroes, copy these to the output, then go to P1 |
| P2 | {0, . . . , 0, 1} (s zeroes then a 1) | {0, . . . , 0, 1} (s zeroes then a 1) | Identify s zeroes followed by a 1, copy next $k_{s-1}$) bits from the input to the output, stay in P2 |
| . . . | . . . | . . . | . . . |
| P2 | {0, 0, 1} | {0, 0, 1} | Perform a copy operation, copy next $k_1$ bits, stay in P2. |
| P2 | {0, 1} | {0, 1} | Perform a copy operation, copy next $k_0$ bits, stay in P2. |
| P2 | {1} | {1} | Perform a copy operation, stay in P2. |

either predetermined or chosen dynamically based on stopping condition (a test of incompressibility).

In another example, s and $k_0$, k1, . . . $k_s$ are determined dynamically. By monitoring the state of each sub-sequence during the process (i.e. fully-compressed, over-compressed, under-compressed or frozen), $k_0$, k1, . . . $k_{s-1}$ (excluding $k_s$) are set in each case the sum of the numbers of fully-compressed and over-compressed sub-sequences is equal or larger than the number of under-compressed sub-sequences (ignoring the number of 'frozen' sub-sequences). Regarding the sum of the numbers, on this equilibrium the price (or cost) of increasing the reset sequence size for the next iterations by one-bit (e.g. from {0,0} to {0,0,0}) on the remaining 'under-compressed' sub-sequences will equal or less than the penalty caused by over-compressing the other over-compressed sub-sequences (also one bit per over-compressed sub-sequence). Frozen is a state of a sub-sequences that are not changing their sizes during the process due to the map switch mechanism. For example, in the example of the 10 sub-sequences, after the map switch the 9 sub-sequences practically freezes-so those 9 sub-sequences are considered in a frozen state for the next iterations. Then, s and $k_s$ are set when the count of sub-sequences which are in state under-compressed equals 0; this is the stopping condition (not a test of incompressibility). In case of dynamic set of $k_0$, k1, . . . $k_s$ will require to supply these values with the compress sequence for the decompression process.

Since these values also requires memory, it should be considered while choosing between the mode of dynamic set of $k_0$, k1, . . . $k_s$ and the mode of pre-defined set of $k_0$, $k_1$, . . . $k_s$.

Considering Table 8, where s and $k_0$, $k_1$, . . . . $K_{s-1}$ (excluding $k_s$) are predetermined parameters, overall, the Algorithm 3 behaves as follows. An initial input sequence is accepted (there is not yet an iteration completed). The initial input sequence is processed by Table 8, gradually increasing bits in a first output sequence. The last bits of the initial input sequence are processed and one iteration has completed. The first output sequence is processed by Table 8. A second output sequence is created. A second iteration has completed. This repeats until either predetermined $k_s$ iterations have completed or until the stopping condition (a test of incompressibility).

The following discussion explains algorithm embodiment in some generic iteration and after some number of switches. This discussion is provided to clarify behavior of the algorithm in the case of dynamic set. Considering Table 8, where s and $k_0$, $k_1$, . . . $k_s$ are determined dynamically, starting from the $m^{th}$ iteration and after i map switches, overall, the output sequence after (m-1) iterations is processed by Table 8. During the process, a monitor counts the number of sub-sequences in each state (fully-compressed, over-compressed, under-compressed and frozen). An output sequence after m iterations is created. The $m^{th}$ iteration is completed. Considering the monitor counts, if the sum of the numbers of fully-compressed and over-compressed sub-sequences is equal or larger than the number of under-compressed sub-sequences, the process controller sets $k_s$=m, i=i+1, m=m+1 and switches the map, otherwise the process controller sets m=m+1. This repeats until the count of sub-sequences which are in state 'under-compressed' equals 0, then the process controller sets s=i, $k_s$=m; this is the stopping condition (not a test of incompressibility).

Comparison with Algorithm 2

Consider a sparse input data which contains 10 binary-1s (i.e. consist of 10 sub-sequences). In this example, the lengths of 9 sub-sequences is generally between 1 to 255 (8 bit length, as the number 255 can be represented with 8 bits) but there is one sub-sequence in the input data with a length around 4,000,000,000 (32 bit length):

In case of Algorithm 2, after 8 iterations (due to the 8 bit length) the 9 sub-sequences will get to their optimal compressed sizes and only the reset sequence (e.g. [0,0]) will separate between these compressed sub-sequences.

These compressed sub-sequences and will be extended in one bit each in every additional iteration (over-compressed) according to known behavior of Algorithm #2.

However, after only 8 iteration the long sub-sequence remains very large (about 24 bits length) and the algorithm needs to continue to perform additional iterations. Following that, on each iteration from now on, the long sub-sequence will continue to geometrically decline in a factor of ½ but there is also a penalty of 9 additional bits per iteration due to the 9 over-compressed sub-sequences. These 9 bits are referred to as being due to a penalty aspect. Thus, only after around 21 additional iterations will the result arrive at the full data optimal compress size, and this result contains 9×21=189 bits that came only from the penalty aspect on over-compressed sub-sequences.

As an approximate calculation, the size of the compressed size using Algorithm 2 will be 9×(2+1+8+21)+1×(2+7+1+8+21)=327 bits (containing 189 bits due to the penalty aspect). The bits due to the penalty aspect constitute about 57% of the total compressed sequence.

In case of Algorithm 3, let the algorithm start exactly like Algorithm 2 (using P2 with d0=1 like M 3 in Algorithm 2) for the first 8 iterations. Then, after 8 iterations the Algorithm 3 switches the map P2 to map with d0=2 (similar but not equal to M3" of Algorithm 2):

P2 (1)=1

P2 (01)=01

P2 (001)=001+copy next 8 bits and continue with P2

P2 (000)=000+switch back to Mi (like in Algorithm 2)

The additional feature of P2 in Algorithm 3 (i.e. "copy next 8 bits and continue with P2") practically freezes the size of all the fully-compressed (and over-compressed) subsequences at a price of longer reset sequence ([0,0,0] instead of [0,0]) for the next iterations.

So now, there are not penalty bits in the next iterations, and the full data optimal compress size will be obtained after an additional approximately 24 iterations (and not 21 as in Algorithm 2).

Finally, as an approximate calculation, the size of the compressed size using Algorithm 3 will be 9×(2+1+8)+1×(3+1+8+24)=135 bits which is about a 58% reduction from Algorithm 2. In this example, $k_0$=8 and $k_1$=32 (not 24).

Also, in case of single binary-1s (not clusters) both algorithms can begin with a reset sequence of [0] (i.e. both algorithms can start with a map with d0=0). In that case, Algorithm 2 will arrive at 317 bits in the optimal compression point, while Algorithm 3 will reach to 125 bits in the optimal compression point (about a 61% improvement).

Considering Algorithm 3, embodiments include a bijective process based on a first bijective map and a plurality of bijective maps, and the plurality of bijective maps sequentially search for a pattern of binary-0 with increasing length before detecting a binary-1. Also, in an example of Algorithm 3, a binary-1 is detected after a first number of binary-0, and a number of input bits copied to the output depends on the first number. Also in this example of Algorithm 3, a switch to a compressive map from a copying map occurs after a detection of a second number of binary-0.

Figure 8:
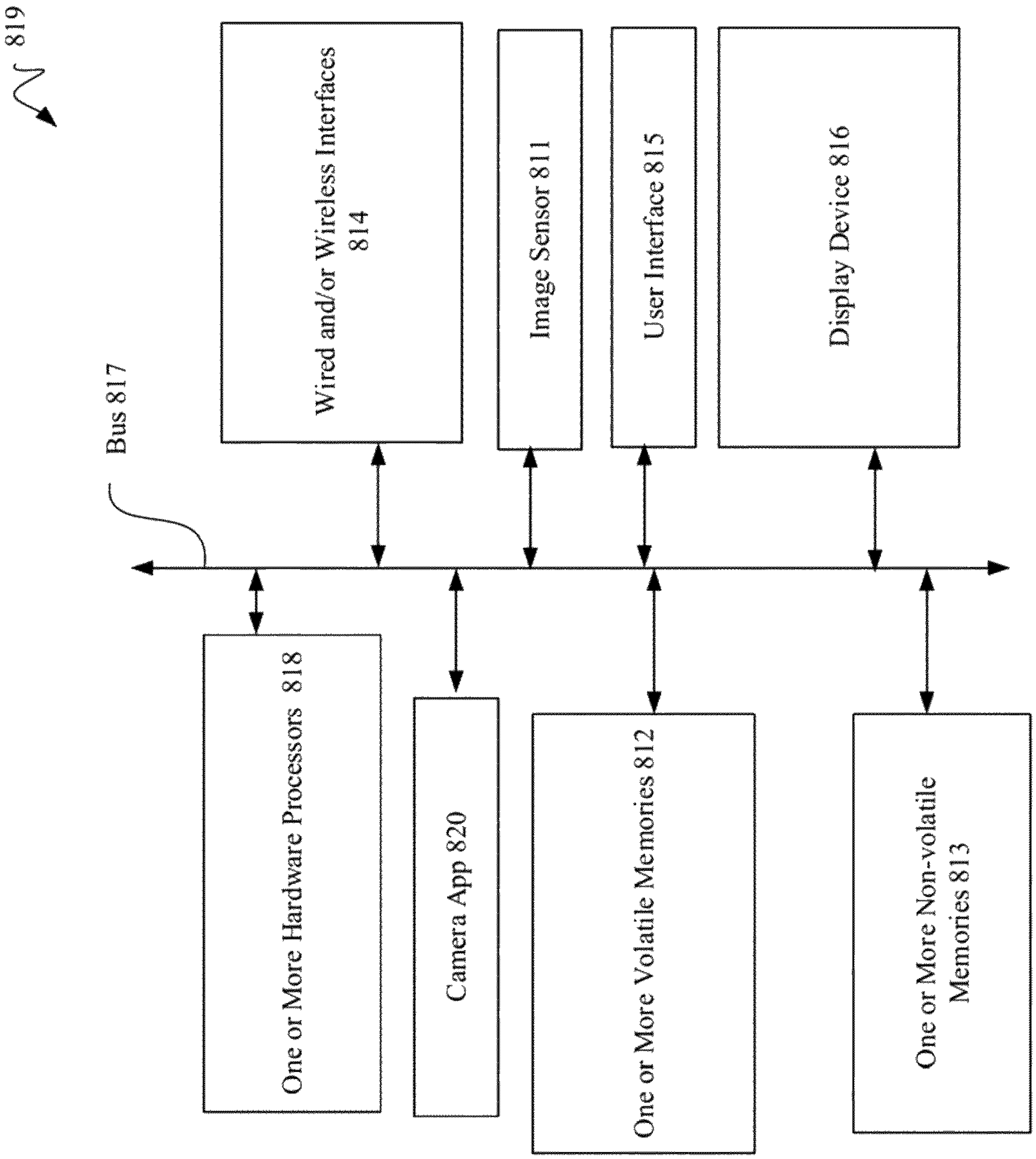
FIG. 8 illustrates an apparatus for implementing one or more of the embodiments.

FIG. 8 illustrates an exemplary apparatus for implementation of the embodiments disclosed herein. The apparatus may be a server, a computer, a laptop computer, a handheld device, or a tablet computer device, for example. The apparatus may include one or more hardware processors 10-1. The one or more hardware processors 818 may include an A SIC (application specific integrated circuit), CPU (for example CISC or RISC device), and/or custom hardware. The apparatus also may include a user interface 815 (for example a display screen and/or keyboard and/or pointing device such as a mouse). The apparatus may include one or more volatile memories 812 and one or more non-volatile memories 813. The one or more non-volatile memories 813 may include a non-transitory computer readable medium storing instructions for execution by the one or more hardware processors 811 to cause the apparatus to perform any of the methods of embodiments disclosed herein.

Computer Technical Performance Discussion

A typical approach to storing a bad pixel map is to use a one time programming (OPT) memory. A typical method of compression (a comparative example, not an embodiment) is to use run-length coding.

Below, the expression "recursive word replacement algorithms" refer to embodiments disclosed by this application, including the examples of Algorithms 1, 2 and 3 discussed above.

Computer technical performance improvements are now discussed.

The recursive word replacement algorithms reduce the silicon area required. The recursive word replacement algorithms are also applicable to applications on than BP map compression. In BP map compression, as an example, the BP map is typically stored in an OTP memory. OTP memory is a type of memory which is a wasteful in the sense of silicon area. Therefore, since the compression ratio performance of Algorithms 1, 2 and 3 have a direct impact on the required OTP memory size, Algorithms 1, 2 and 3 also have a direct impact on reducing the silicon area in the chip. Better compression ratio performance lead to less silicon area required for OTP memories.

In the context of HW dynamic power consumption, Algorithms 1, 2 and 3 are more efficient as explained here.

As a comparative example (not an embodiment) run-length encoding typically requires an adder component in some bittage size (e.g. 16 bit adder) to count the length of zeros in a sequence (e.g. up to max length of 65,535 in 16 bit adder). This implies that in a single sub-sequence of 65,535 binary-0s (for example) ending with a single binary-1, during the counting, each counted zero may lead to between 1 to 16 bit-toggles (a bit toggle changes a bit from 0 to 1 or 1 to 0). During of counting of 65,535 binary-0s using a 16 bit adder Algorithms 1, 2 and 3 will perform 131,054 bit-toggles (according to $2^{b+1}-b-2$, where b in is the size of the adder (16), and the result is the number of bit-toggles in full counting).

In contrast, as an example, in Algorithm 2 map 1, the input is shrinking [0,0]→[0] (no bit-toggles), and only at the end of each sub-section per iteration does the algorithm do [0,1]→[1,1], or [1]→[1,0] (single bit-toggle). It follows that, since for handling 16-bit zero length, Algorithm 2 needs 16 iterations then Algorithm 2 requires only 16 bit-toggles. This means that the number of maximal bit-toggles has linear dependency in 'b' in the recursive word replacement algorithms compares to geometrical dependency in b in counter-based methods (for example, run-length encoding).

Chip yield is increased in instances as follows. As mentioned, the BP map is typically stored in a OTP memory which is a type of memory which is wasteful in the sense of silicon area. In some cases an application will have limited memory to store the BP map, and in case the compressed BP map can't be allocated in the given size of memory the chip is dropped (i.e., deemed faulty and hurting chip yield). Better compression ratio avoids instances of chip drops and increase the yield.

In FIG. 4, shown is an outcome in the displayed image caused by the recursive word replacement algorithm, where the image is better, the rendering is faster, and the memory is smaller.

In dynamic BP compression, recursive word replacement algorithms give the ability to pass data from one frame in time to the second one in time cost-effectively. It is not cost-effective for a comparative example of run-length coding. In this context, indirectly, the recursive word replacement algorithms lead to improving the output image quality. The image quality improvement is from the aggregation of dynamic BPs over time, which is made possible by existence of the recursive word replacement algorithms provided in embodiments.

What is claimed is:

1. A method of compressing an initial input sequence comprising a plurality of words to obtain a compressed output sequence using a plurality of recursion stages, the method comprising:

inputting a first word into a first recursion stage of the plurality of recursion stages, wherein the plurality of words comprises the first word;

replacing, in the first recursion stage, the first word to obtain a second word and outputting the second word to a second recursion stage of the plurality of recursion stages; and repeating the inputting, the replacing and the outputting until a final word of the initial input sequence has been replaced by the first recursion stage, wherein the plurality of words comprises the final word, wherein successive recursion stages continue to perform the inputting, the replacing and the outputting until no further second words are provided to the successive recursion stages (?) from an upstream recursion stage, wherein an output sequence at an output of a final recursion stage of the plurality of recursion stages is the compressed output sequence, and wherein hardware power consumption is reduced by reducing bit-toggles.

2. The method of claim 1, wherein the method is implemented in software by a processor executing instructions from a memory.

3. The method of claim 1, wherein the plurality of recursion stages are implemented with dedicated hardware circuits comprising Boolean logic, flip-flops and clock circuitry, wherein one dedicated hardware recursion stage is implemented to implement each of the plurality of recursion stages, the plurality of recursion stages are arranged in a pipeline fashion, and a hardware memory associated with each recursion stage is configured to store only one byte of data or less.

4. The method of claim 1, further comprising:

decompressing the output sequence to recover the initial input sequence, wherein the initial input sequence represents an input matrix; and providing a display image on a display device based on the input matrix, wherein a binary 1 in the input matrix indicates a bad pixel in the display device.

5. The method of claim 1, wherein the replacing is based on a bijective process.

6. The method of claim 5, wherein the bijective process is based on only one bijective map.

7. The method of claim 5, wherein the bijective process is based on two or more different bijective maps.

8. The method of claim 6, wherein the only one bijective map is configured to map a first first input word {0, 0, 0, 0} to a first first output word {0, 0, 0}, a second first input word {0, 0} to a second first output word {0, 0, 1}, a third first input word {0, 1} to a third first output word {0, 1}, and a fourth first input word {1} to a fourth first output word {1}.

9. The method of claim 1, wherein a global minimum length of the output sequence is preceded by a first iteration implemented by the first recursion stage characterized by a geometric shrinkage of the initial input sequence as an under-compressed sequence and the global minimum length is followed by a last iteration implemented by an additional recursion stage after the final recursion stage is characterized by a linear expansion.

10. The method of claim 5, wherein the bijective process is characterized by applicability of super-position in a dividing the initial input sequence into a first sub-sequence and a second sub-sequence.

11. The method of claim 6, wherein the two or more bijective maps comprise a first bijective map, a second bijective map and a third bijective map,
wherein the first bijective map is configured to:
replace a first first input word {0, 0} with a first first output word {0},
replace a second first input word {0, 1} with a second first output word {1, 1}, and
replace a third first input word {1} with a third first output word {1, 0},
wherein the second bijective map is configured to perform a first copy map operation, and
wherein the third bijective map is configured to perform a second copy map operation.

12. The method of claim 6, wherein application of the bijective process to the initial input sequence achieves an geometric shrinking factor of approximately 50% at each iteration.

13. An apparatus for compressing an initial input sequence comprising a plurality of words to obtain a compressed output sequence using a plurality of recursion stages, the apparatus comprising:
a plurality of word replacement operators configured in a pipeline fashion, the plurality of word replacement operators being indexed with an index k, and the index k ranging from 1 to N,
an input terminal configured to accept input words of an initial sequence;
an output terminal configured to provide output words for storage in a memory; and
a controller configured to control the plurality of word replacement operators,
a first word replacement operator configured to accept a first input word from the input terminal and replace the first input word with a first output word and pass the first output word to a second word replacement operator, wherein the first word replacement operator is configured with the index of k=1 and the second word replacement operator is configured with the index of k=2,
wherein N-2 instances of the plurality of word replacement operators are configured as a kth word replacement operator configured to accept a second input word from a (k−1)th word replacement operator and replace the second input word with a second output word and pass the second output word to a (k+1)th word replacement operator,
wherein a last instance of the plurality of word replacement operators is configured as an Nth word replacement operator configured to accept a third input word from an (N-1)th word replacement operator, replace the third input word with a third output word and pass the third output word to the output terminal, and
wherein the controller is configured to:
provide the input words from the initial sequence to the first word replacement operator until the initial sequence is exhausted, and
activate word replacement at each word replacement operator which has received a word from an upstream word replacement operator,
whereby hardware power consumption is reduced by reducing bit-toggles.

14. The apparatus of claim 13, further comprising a pre-processing stage configured upstream from the plurality of word replacement operators and after the input terminal,
the pre-processing stage comprising a processor and a second memory,
the second memory storing computer program code configured to cause the processor to:
identify cluster shapes in the initial input sequence, wherein the initial input sequence represents a two dimensional array of pixels, and a cluster shape represents a cluster of bad pixels (BPs),
assign a first fixed bit sequence (FBS) of a set of fixed bit sequences to a first cluster shape,
retain a dictionary indicating the first FBS assigned to the first cluster shape and a second FBS assigned to a second cluster shape,
perform a replacement of cluster shapes of the initial input sequence with corresponding FBS values from the dictionary to obtained a flattened sequence, and
provide the flattened sequence to the first word replacement operator as an input sequence to be processed.

15. The apparatus of claim 14, wherein the processor is configured to perform the assigning based on a Huffman encoding principle.

16. The apparatus of claim 14, wherein the pre-processing stage is configured to determine a distance characteristic do of the set of fixed bit sequences based on a statistical distribution of unique cluster shapes of the initial input sequence.

17. The apparatus of claim 16, wherein a small value of do is chosen if there are a small number of unique cluster shapes in the initial input sequence.

18. The apparatus of claim 17, wherein the small value of do is 0 and the small number of unique cluster shapes is 4 or less unique cluster shapes per 1000 clusters.

19. The apparatus of claim 16, wherein a large value of do is chosen if there are a large number of unique cluster shapes in the initial input sequence.

20. A non-transitory computer readable medium storing instructions, the instructions configured to cause one or more apparatuses to perform the method of claim 1.

* * * * *